(12) United States Patent
Oda et al.

(10) Patent No.: US 6,829,079 B2
(45) Date of Patent: Dec. 7, 2004

(54) OPTICAL PATH CONTROL APPARATUS WITH MIRROR SECTION, AND MANUFACTURING METHOD FOR THE SAME

(75) Inventors: Mikio Oda, Tokyo (JP); Mitsuru Yamamoto, Tokyo (JP); Hikaru Kouta, Tokyo (JP); Yasuhiro Sasaki, Tokyo (JP); Sakae Kitajo, Tokyo (JP); Yuzo Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/028,238

(22) Filed: Dec. 21, 2001

(65) Prior Publication Data

US 2003/0117690 A1 Jun. 26, 2003

(30) Foreign Application Priority Data

Dec. 22, 2000 (JP) ........................................ 2000-389991

(51) Int. Cl.[7] ................................................ G02F 1/29
(52) U.S. Cl. ........................ 359/318; 359/298; 359/315
(58) Field of Search ................................ 359/298, 315, 359/318, 320–1, 871–2, 881, 877–8, 883–4

(56) References Cited

U.S. PATENT DOCUMENTS

| 5,379,357 A | * | 1/1995 | Sentsui et al. ................ 385/11 |
| 5,450,246 A | * | 9/1995 | Jain ............................ 359/877 |
| 5,684,616 A | * | 11/1997 | Brotz ......................... 359/198 |
| 6,075,239 A | | 6/2000 | Aksyuk et al. |
| 6,094,293 A | * | 7/2000 | Yokoyama et al. ......... 359/280 |
| 6,283,601 B1 | * | 9/2001 | Hagelin et al. ............. 359/871 |
| 6,583,914 B1 | * | 6/2003 | Muller et al. ............... 359/212 |
| 2002/0001870 A1 | * | 1/2002 | Oda et al. .................... 438/48 |

FOREIGN PATENT DOCUMENTS

| CA | 1277525 | 12/1990 |
| CA | 2230664 | 7/1998 |
| CA | 2277471 | 7/1998 |
| CA | 2288920 | 6/2000 |
| CA | 2 229 832 | 9/2000 |
| JP | 59-007916 | 1/1984 |
| JP | 64-059303 | 3/1989 |
| JP | 04-333004 | 11/1992 |
| JP | 06-084455 | 3/1994 |
| JP | 07-159658 | 6/1995 |
| JP | 09-008273 | 1/1997 |
| JP | 2687859 | 8/1997 |
| JP | 09-218304 | 8/1997 |
| JP | 09-257811 | 10/1997 |
| JP | 10-170765 | 6/1998 |
| JP | 64-017015 | 1/1999 |
| JP | 2000-121967 | 4/2000 |
| JP | 3076465 | 6/2000 |
| JP | 2000-258704 | 9/2000 |
| WO | 98/15676 | 4/1998 |

OTHER PUBLICATIONS

"Use of AUSN Solder Bumps in Three–Dimensional Passive Aligned Packaging of LD/PD Arrays on Si Optical Benches" by Masataka Itoh, et al. (46th Electronic Components and Technology Conference: pp. 1–7) (May 1996).

"Microactuators for Aligning Optical Fibers" by R. Jebens, W. Trimmer and J. Walker Sensors and Actuators, 20(1989), p. 65–73 (Feb. 1989).

"MOEMS Fabricated by the LIGA Technique—An Overview" J. More, p. 221–226 (1997).

"High Density Micromachined Polygon Optical Crossconnects Exploiting Network Connection–Symmetry" By L.Y. Lin, et al. (IEEE Photon Technol. Lett. 10, pp. 1425–1427) (Oct. 1998).

"Optical MEMS" Fujita, et al., IEICE Trans. Electron, vol. E83–C, No. 9 Sep. 2000, pp. 1427–1434.

* cited by examiner

Primary Examiner—Jordan M. Schwartz
Assistant Examiner—Jessica Stultz
(74) Attorney, Agent, or Firm—Katten Muchin Zavis Rosenman

(57) ABSTRACT

An optical path control apparatus includes a first substrate. A second substrate is movably provided for the first substrate. A mirror section is provided on the second substrate. A driving section moves the second substrate such that a first optical path of input light to the mirror section is optically connected to one of a plurality of second optical paths.

7 Claims, 43 Drawing Sheets

LIGHT AXIS

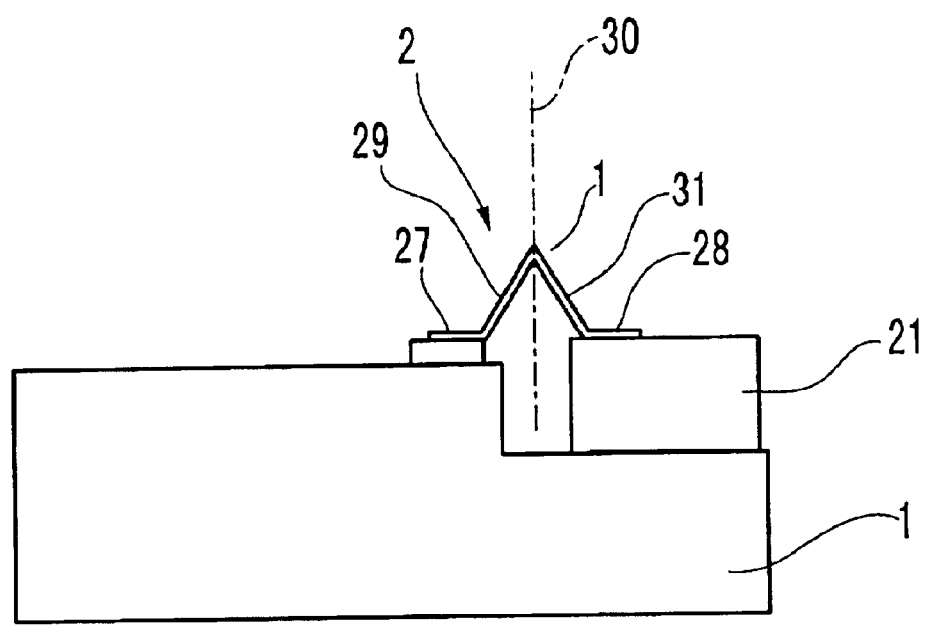

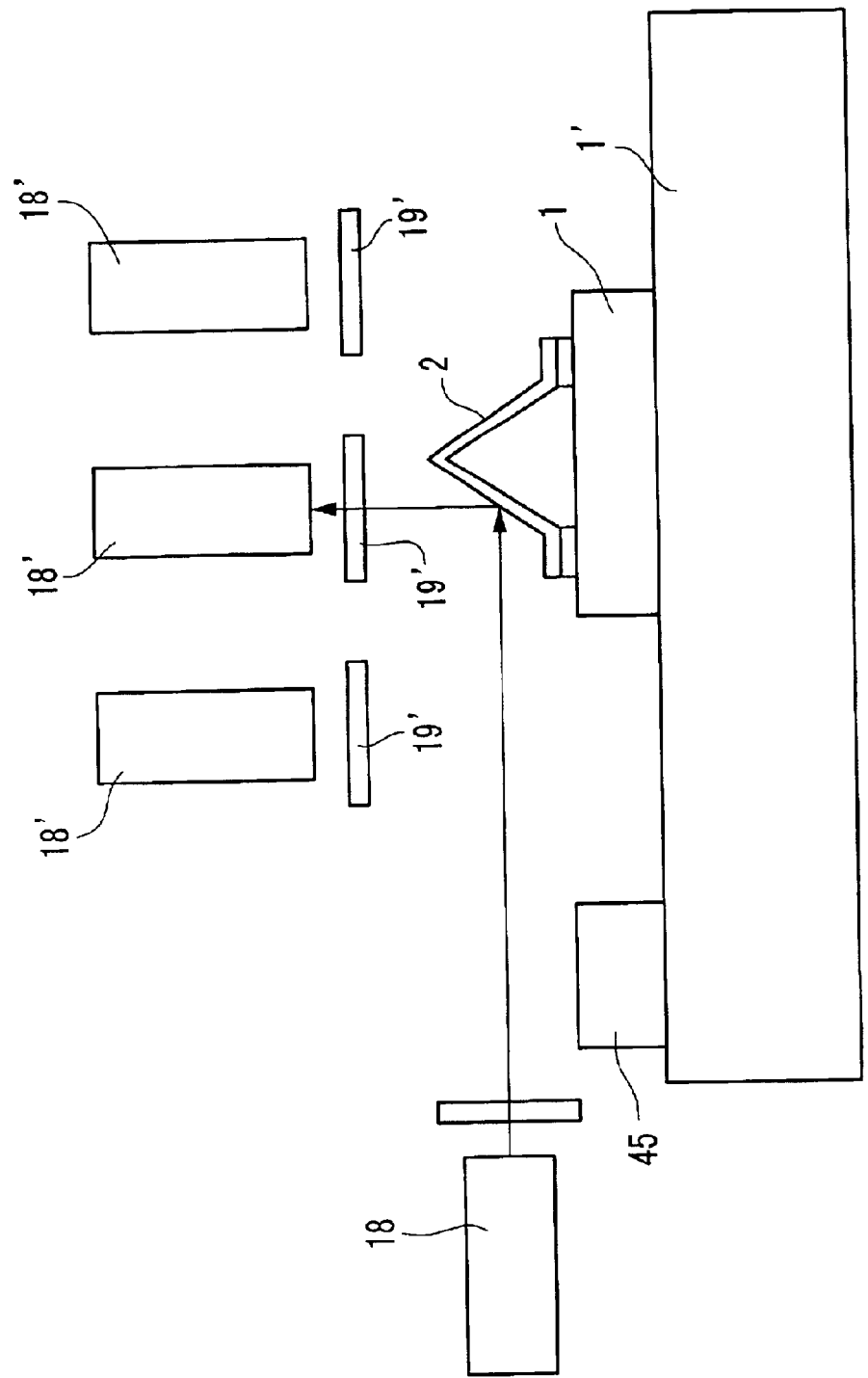

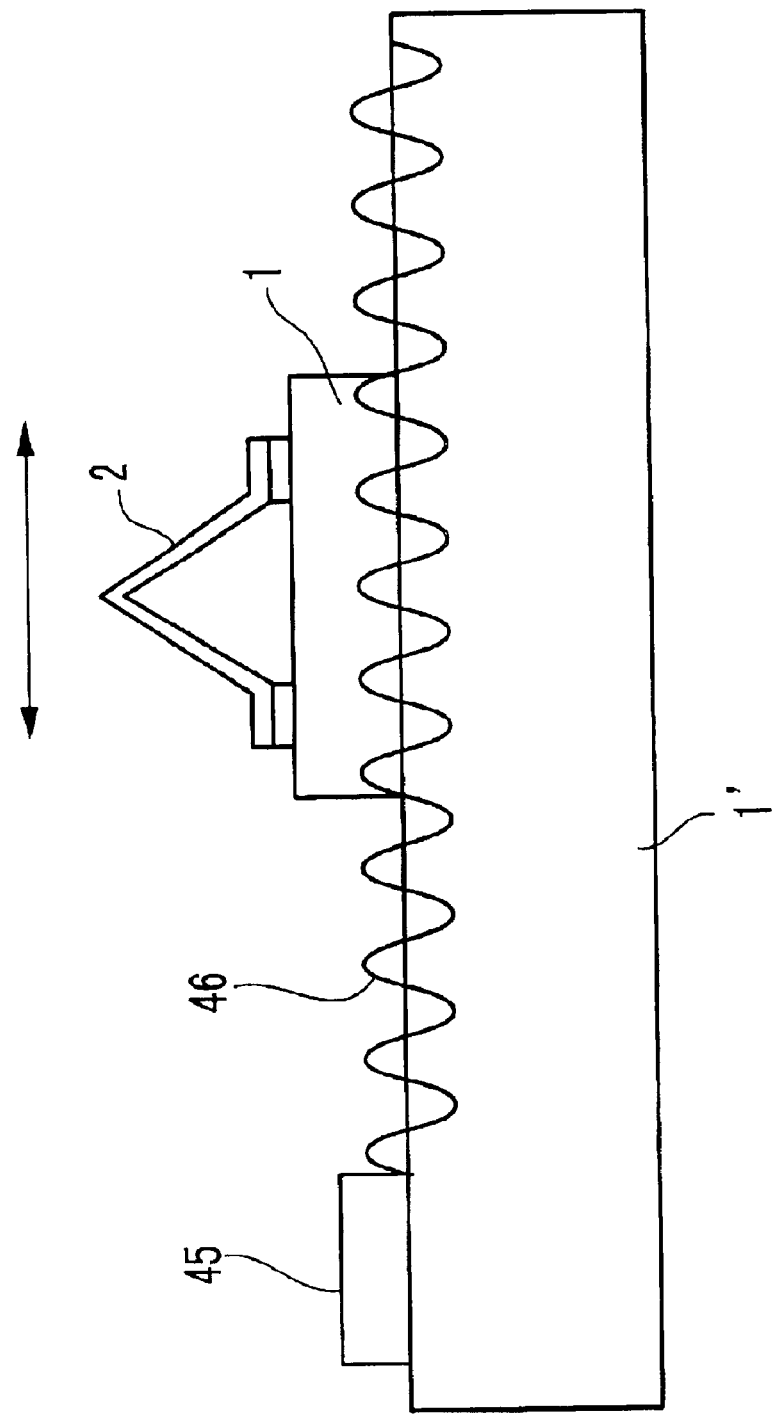

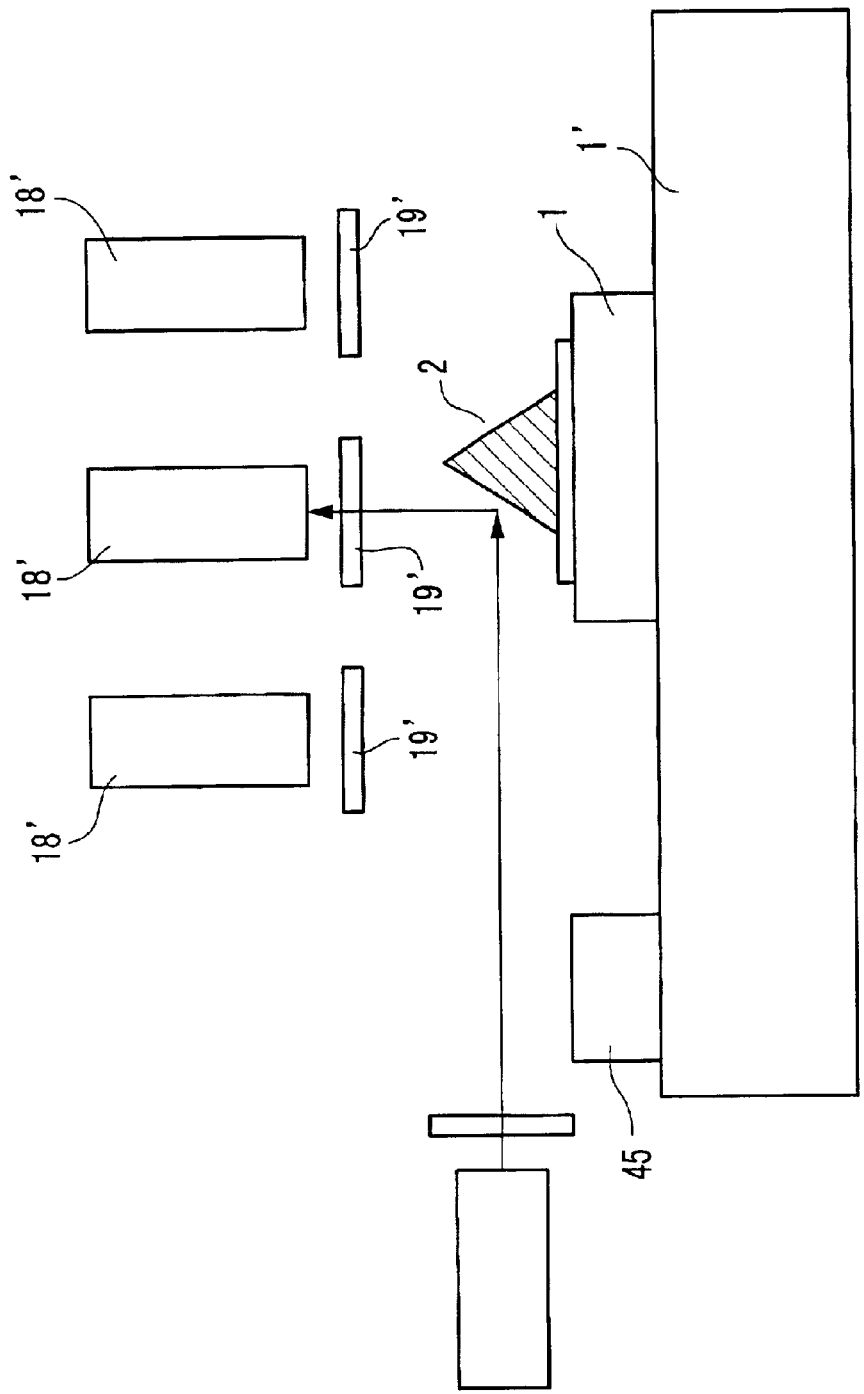

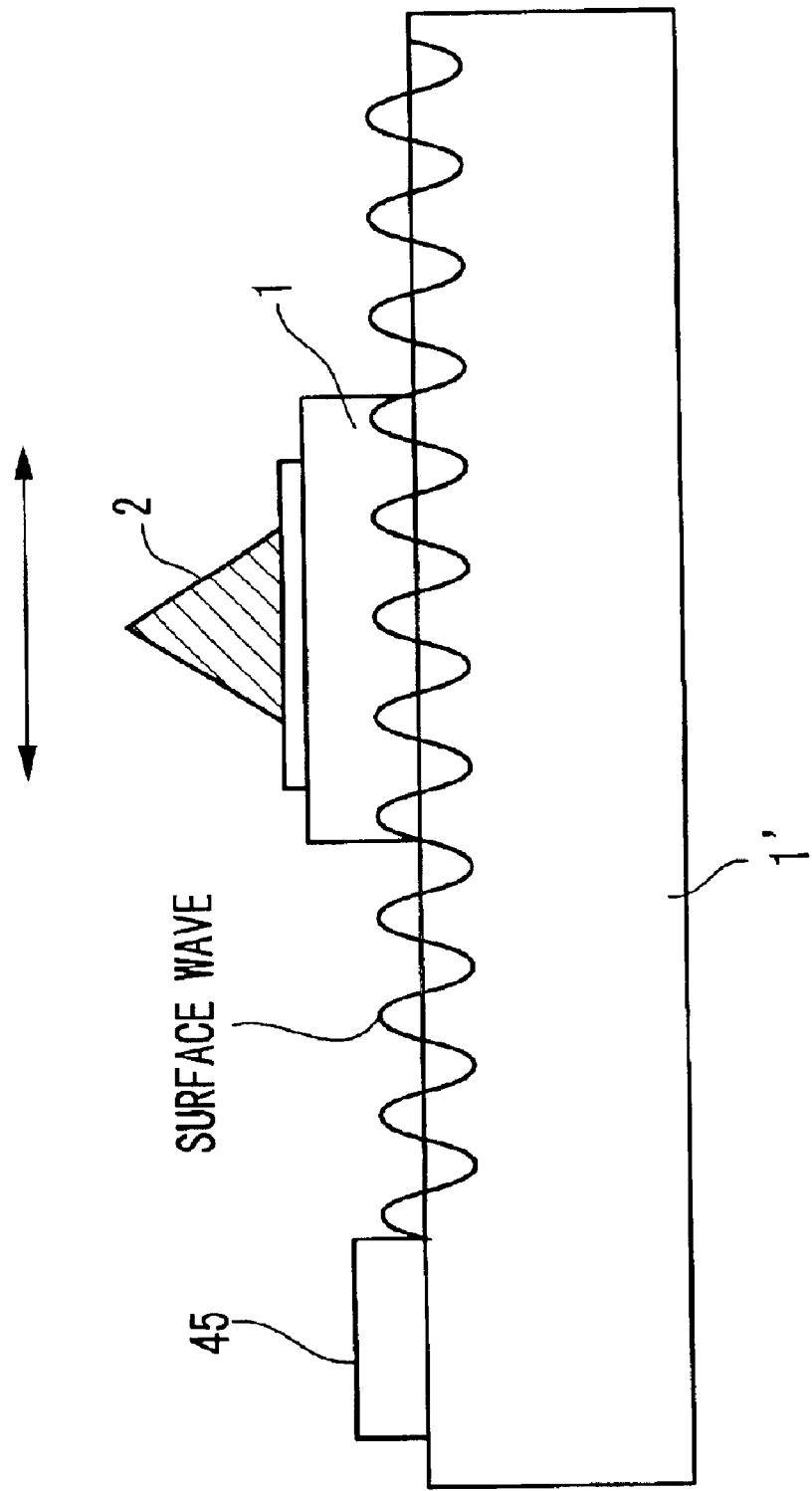

OPTICAL PATH CONTROL APPARATUS WITH MIRROR SECTION, AND MANUFACTURING METHOD FOR THE SAME

BACKGROUND OF THE INVENTION

1. Field of the Invention

The present invention relates to an optical path control apparatus with a mirror section and a manufacturing method for the same.

2. Description of the Related Art

With the request of the communication of a large amount of data, it has been studied to apply a large capacity of optical communication to real time parallel transmission between computers, switching apparatuses, and large-scaled computers or to a subscriber system in the advanced data service. Also, the further spreading of the optical communication is demanded.

An optical module is used in the optical communication is composed of optical elements such as an optical fiber, a laser diode device (LD), a light-emitting diode (LED), and a photodiode (PD). The application fields of the optical module are being widened as the result of the high performance and high functioning of the passive and active elements of the optical module. For the optical communication to the subscriber system, it is demanded to reduce the prices of each optical element and optical module using the optical elements.

For the low price of the optical circuit, a planar type optical circuit is desirable in which the optical elements are arranged on a substrate, compared with a coaxial type module structure in which the optical elements are arranged in a block. FIG. 1 shows a first conventional example of a planar type optical module for bidirectional communication. A laser diode (LD) 102, a photodiode (PD) 103, an optical waveguide 104, a wavelength filter 105, and an optical fiber 106 are arranged on a Si substrate 101. Output light outputted from the laser diode 102 as a transmission source and having the wavelength of 1.3 μm is inputted to the optical waveguide 104, and is outputted from the optical fiber 106 via the wavelength filter 105. An optical signal transmitted through the optical fiber 106 and having the wavelength of 1.55 μm is inputted to the optical waveguide 104, an optical path of the optical signal is changed into an adjacent waveguide by the wavelength filter 105, and then the optical signal is inputted to the photodiode (PD) 103 for reception of the optical signal. In this way, using the planar type light circuit, a small optical transmission and reception module can be realized. In a conventional semiconductor process, grooves are formed for positioning the optical waveguide 104, the wavelength filter 105, and the optical fiber 106 on the Si substrate 101. With this, it is possible to reduce the manufacturing cost, and the installation cost and the decrease of the installation area is realized.

Optical devices are divided into a first type of optical devices such as the light-emitting diode (LED) and the photodiode (PD) and a second type of optical devices such as the laser diode (LD). When the optical device is installed, the light is emitted or received from and by the surface of the optical device in the first type of optical device, while light is emitted from or received by the side surface. When the two types of devices in which light axes are orthogonal to each other should be arranged on the substrate and optically coupled to each other, the optical path conversion of 90 degrees is needed.

As shown in a second conventional example of FIG. 2 by Masataka Itoh, et. al., (46th Electronic Component & Tecnology Conference, p. 1), an output light from an optical fiber 106 is reflected by a sloped reflection plane 109 which is produced by anisotropically etching a silicon substrate 101. Thus, an optical path is changed into the direction to the photodiode (PD) 103. However, in this method, the substrate material is limited to silicon and a substrate of other material cannot be handled.

Also, as shown in a third conventional example of FIG. 3 disclosed in Japanese Laid Open Patent Application (JP-A-Heisei 7-159658), a prism is known as an optical path conversion element. The optical path of a light beam 107 outputted from an optical waveguide 104 is changed by 90 degrees by a prism 108 or a reflection surface 109 of a reflection mirror. The manufacturing cost of the prism smaller than 1-mm size is high and the use of such a smaller prism causes the increase of the number of parts and takes a long installation time.

A fourth conventional example in which an optical path is not changed is shown in FIG. 4. For the installation of a photodiode (PD) 103 in a non-planar state, a three-dimensional position adjusting tool is newly necessary. For example, it is necessary to add another substrate 110 to support the photodiode (PD) 103 and parts to fix the substrate on an adjustment position, resulting in more increase of the manufacture cost.

By the way, light outputted from light-emitting device such as a light-emitting diode or a laser diode has a radiation angle. Therefore, even if a waveguide or an optical fiber is arranged in the neighborhood of the radiation section of the light-emitting device, a light loss is large. However, it is difficult to produce a lens with a good light convergence for a small light loss, resulting in more increase of the manufacturing cost.

Even if the above problems are supposed to have been solved, a light switch as an optical path control apparatus becomes necessary for the optical path conversion. As the optical path control apparatus, an un-movable switch and a movable switch are known. The technique using the electro-optic effect and magneto-optics effect of optical crystal is known in the un-movable switch. As the movable switch, the technique to drive an optical fiber mechanically is known as shown by R. Jebens et. al., (Sensors and Actuators 20, pp. 65–73, 1989), or the technique to drive a small mirror (Micro-opto-electro-mechanical-systems: MOEMS) is known as shown by L. Y. Lin. et. al., (IEEE Photon Technol. Lett. 10, 1425, 1998) and by J. Mohr et. al., (Technical Digest of International Conf. on Optical MOEMS and Their Applications, p221–226). The latter technique is expected as the technique for realizing a large-scale light switch cheaply.

The above-mentioned light switch of MOEMS is produced by applying a semiconductor fine fabrication technique to a silicon substrate. According to the above technique, there is a problem that the substrate material is limited to silicon, and the light switch cannot be realized on a printed circuit board whose inside layer wiring is possible. An example in which a mirror and an electrostatic actuator are formed by a Ni plating method in LIGA (Lithographie Galvanoforming Abforming) process is known. However, there is a problem in that the surface roughness of the mirror is large and the light loss is large.

An optical path adjustment between the optical fiber and the photodiode (PD) in the optical module is mainly carried out using the flat surface of the silicon substrate as shown in above-mentioned technique (Masataka Itoh, et. al.).

However, because a substrate other than the silicon substrate cannot be used as the substrate for the optical module, the flexibility of manufacturing the optical module is restricted strongly.

In conjunction with the above description, an optical waveguide—optical device coupling structure is disclosed in Japanese Laid Open Patent application (JP-A-Heisei 7-159658). In this reference, an optical waveguide and an optical device are optically coupled which are formed by laminating different dielectric layers on a dielectric substrate. The dielectric substrate has a groove section provided in front of an end of the optical waveguide on the installation side of the optical device, to have a base surface parallel to the optical waveguide surface. A prism is installed on a position where the light axis of the optical waveguide and the light axis of the optical device are coincident with each other. The optical device is installed onto the dielectric substrate over the prism and the optical waveguide.

Also, a manufacturing method of a micro mirror is disclosed in Japanese Laid Open Patent Application (JP-A-Heisei 9-218304). In this reference, a reflection film is formed on a flat surface of a substrate. The substrate is cut away from the other surface of the substrate to the reflection film using a dicing blade which has the tip angle of 90 degrees. The substrate is cut to keep a predetermined width of the reflection film and to have a cut plane orthogonal to the above cut plane. Thus, the micro mirror is produced.

Also, a light switch is disclosed in Japanese Laid Open Patent Application (JP-P2000-121967A). In this reference, a counter bore is formed in a substrate. A movable plate is formed in the counter bore to be coupled to the substrate via a pair of flexure sections. A mirror is formed on the upper surface of the movable plate. The mirror is formed to have a right angle to the movable plate and to have an inclined surface to input light.

Also, a light switch is disclosed in Japanese Laid Open Patent Application (JP-P2000-258704A). In this reference, a movable electrode 12 is provided in parallel to the surface of a conductive substrate and movably in a direction perpendicular to the substrate surface. A micro mirror is installed on the movable electrode 12. A concave section is formed in a surface portion of the substrate by an etching process. The bottom surface of the concave section functions as a fixed electrode surface to the movable electrode.

Also, a micro actuator is disclosed in Japanese Patent No. 3,076,465. In this reference, a driving section has a fixed electrode and a movable electrode. Each of at least two driven sections is supported by a joint at one end. The driven section is repeatedly bent at the joint. The driving section drives the driven section by electrostatic force generated when a voltage is applied between the fixed electrode and the movable electrode. The displacement direction of the driven section is different from the direction of the force generated by the driving section.

SUMMARY OF THE INVENTION

Therefore, an object of the present invention is to provide an optical path control apparatus with a mirror section in which the mirror section is installed three-dimensionally.

Another object of the present invention is to provide an optical path control apparatus with a mirror section in which various types of substrates can be used.

Still another object of the present invention is to provide an optical path control apparatus with a mirror section in which the mirror section can be driven simply.

In an aspect of the present invention, an optical path control apparatus includes a first substrate; a second substrate movably provided for the first substrate; a mirror section provided on the second substrate; and a driving section which moves the second substrate such that a first optical path of input light to the mirror section is optically connected to one of a plurality of second optical paths.

Here, the driving section may be a ultrasonic wave generating source, and the second substrate may be moved by progressive waves generated by the ultrasonic wave generating source and may be located on a position by standing waves. Thus, the first optical path is optically connected to the second optical path associated with the position.

Also, the driving section may be an ultrasonic wave-generating source is a piezo-electric device.

Also, the driving section may include two electromagnets, and the second substrate may be a permanent magnet provided between the two electromagnets. The permanent magnet is moved between two positions based on magnetic polarities of the two electromagnets, and the first optical path is optically connected to the second optical path associated with one of the positions.

Also, the second substrate has a gear shape, and the mirror section is provided on the second substrate via a base section. The driving section may have an electrostatic actuator, and rotate the second substrate based on force generated by the electrostatic actuator such that the mirror section is rotated. The first optical path is optically connected to the second optical path associated with a rotation angle of the mirror section.

Also, the second substrate has a micro light wheel. The driving section may have lasers, and rotate the second substrate based on laser beams emitted by the lasers. The first optical path is optically connected to the second optical path associated with a rotation angle of the mirror section.

Also, the second substrate may be provided in a concave section of the first substrate, and the concave section may be filled with fluid. The driving section may move the second substrate by supplying the fluid from one end of the concave section and absorbing the fluid from another end of the concave section. The mirror section reflects the input light based on the movement of the second substrate such that the first optical path is optically connected to the second optical path.

Also, the mirror section may be a thin film mirror or a lump type mirror.

In another aspect of the present invention, an optical path control apparatus includes a substrate; and a mirror section which is provided on the substrate and changes an optical path of reflection light to input light by the mirror section in response to an input signal.

Here, the mirror section having two mirror portions, each of which may include: a mirror layer provided as a surface layer; and an underside layer provided under the mirror layer and having a conductive line. The tow mirror portions attract or repel each other based on current as the input signal supplied to the conductive lines such that a reflection angle of the mirror section is changed.

Also, the mirror section may include: a mirror layer provided as a surface layer; a transformed layer provided under the mirror layer; and an electrode layer provided under the transformed layer. The mirror layer of the mirror section is transformed through transformation of the transformed layer in response to supply of the input signal such that a reflection angle of the mirror section is changed.

Also, the mirror section having two mirror portions, each of which may include: a mirror layer provided as a surface layer; and a magnetic layer provided under the mirror layer. The tow mirror portions attract or repel each other through magnetization of the magnetic layer based on the input signal such that a reflection angle of the mirror section is changed.

Also, the mirror section may include: a mirror layer provided as a surface layer; a shape memory layer provided under the mirror layer; and a heating layer provided under the shape memory layer. The mirror layer of the mirror section is transformed due to transformation of the shape memory layer through heating by the heating layer in response to the input signal such that a reflection angle of the mirror section is changed.

Also, the mirror section may be a thin film mirror, or the mirror section is a lump type mirror.

In Still another aspect of the present invention, a method of manufacturing a mirror section is achieved by providing a die of semiconductor having a concave section; by forming a copper layer on a surface of the die; by forming a mirror film on the copper layer; by forming a transforming film on the mirror film; by film to produce a laminate structure of the copper layer, the mirror film, and the transforming film; by transferring the laminate structure onto a base; and by removing the copper layer to produce the mirror section on the base.

Here, the step of forming the transforming film may include the steps of: forming a transformed film on the mirror film; and forming an electrode film on the transformed film. In this case, the transformed film may be formed of one of electric-distortion material, magnetic distortion material, and opto-magnetic distortion material.

Also, the method may further include the steps of: forming a resist layer on the mirror section; forming an opening in the resist layer corresponding to a tip portion of the mirror section; and removing the tip portion of the mirror section.

Also, in another aspect of the present invention, a method of manufacturing a mirror section is achieved by forming a connection layer on a base; by locating a bump on the connection layer; and by pushing a die against the bump to produce a mirror section.

Also, in another aspect of the present invention, an optical path control apparatus includes a first substrate; a second substrate movably provided for the first substrate; a mirror section provided over the first and second substrate; and a driving section which moves the second substrate such that a first optical path of input light to the mirror section is optically connected to one of a plurality of second optical paths.

Also, in another aspect of the present invention, an optical path control apparatus includes: a thermal transforming cell; a mirror section provided on the thermal transforming cell; and heating section which heats the thermal transforming cell.

Also, in another aspect of the present invention, a method of switching an output optical path is achieved by reflecting input light on an input optical path onto a first output optical path by a mirror section; by moving or transforming the mirror section; and by optically connecting the input light to a second output optical path through the movement or transformation of the mirror section.

In this case, the step of moving or transforming the mirror section may be achieved by one of electrostatic force, magnetic force, force generated by ultrasonic waves, optical force generated by laser beam, pressure of fluid, and mechanical force.

BRIEF DESCRIPTION OF THE DRAWINGS

FIG. 11 is a cross sectional view showing the optical path control apparatus according to a second embodiment of the present invention;

FIGS. 21A and 21B are cross sectional views showing the operation states of the optical path control apparatus according to a sixth embodiment of the present invention;

FIGS. 32A-1, 32A-2, 32B, 32C-1, and 32C-2 are diagrams showing a manufacturing method of the mirror section;

FIGS. 34A and 34B are cross sectional views showing the optical path control apparatus according to a fourteenth embodiment of the present invention;

FIGS. 40A-1 to 40D-2 are diagrams showing the manufacturing method of the optical path control apparatus according to the eighteenth embodiment of the present invention.

DESCRIPTION OF THE PREFERRED EMBODIMENTS

An optical path control apparatus with a mirror section such as a light switch of the present invention will be described below in detail with reference to the attached drawings.

A U.S. patent application relating to the present application was filed on Feb. 28, 2001 with the application Ser. No. 09/796,257. The disclosure of the patent application is incorporated herein by reference.

Figure 5:
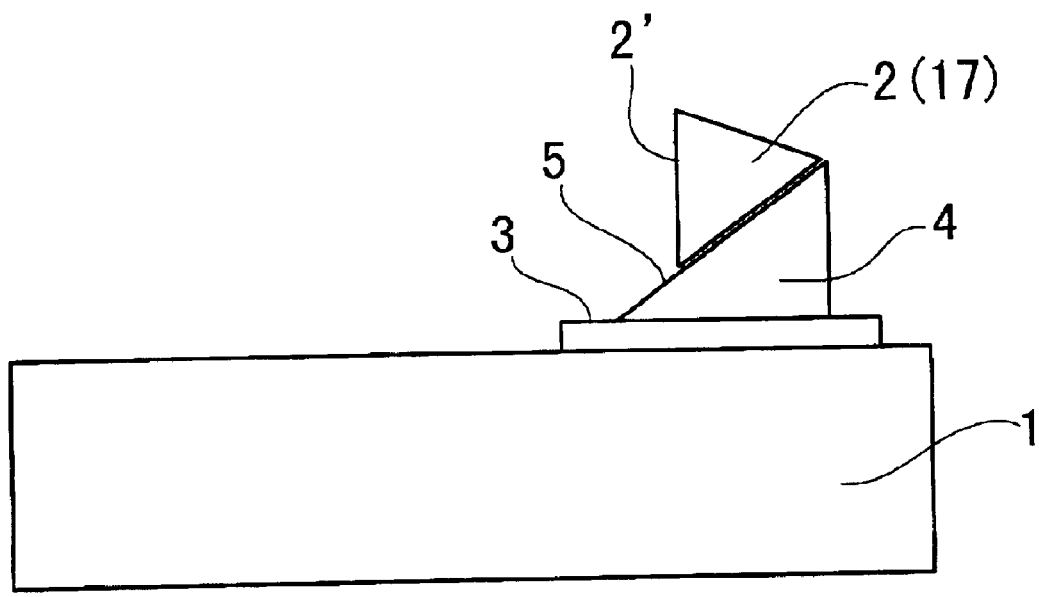
FIG. 5 is a cross sectional view showing an optical path control apparatus according to a first embodiment of the present invention.

Referring to FIG. 5, the optical path control apparatus according to the first embodiment of the present invention has the mirror section 2 installed on a substrate 1. As shown in FIG. 5, the mirror section 2 is arranged on the surface of the substrate 1 via a base section 4 three-dimensionally. A gear 3 of a disk shape is rotatably arranged on the surface of the substrate 1. The base section 4 is coupled to the gear 3 coaxially. The mirror section 2 is formed in another process to be described later, and is peeled from a die and transferred and joined to the slope of the base section 4. The mirror section 2 is formed to have a shape like a triangular pyramid, a triangular prism, a square pyramid, or a square prism. In case of the mirror section 2 of a triangular prism, the mirror section 2 may have the vertical cross section of an equilateral triangle parallel to the center axis of the gear 3 and three angles are 60 degrees, respectively. The base section 4 has the vertical cross section of a right triangle and the angle of 30 degrees between the slope 5 and the surface of the gear 3. One surface of the mirror section 2 is formed as a reflection surface 2' and the angle between the reflection surface 2' and the surface of the substrate 1 is 90 degrees so that the reflection surface 2' orthogonalizes to the surface of the substrate 1.

Figure 6A:
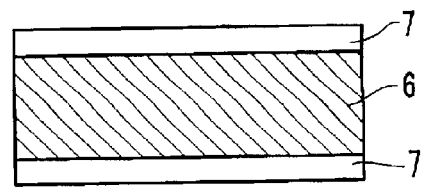
FIGS. 6A to 6H are cross sectional views showing a manufacturing method of a mirror section used in the optical path control apparatus in the first embodiment.
Figure 6B:
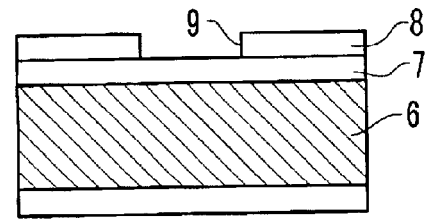

FIGS. 6A to 6H show a manufacturing method of the mirror section 2 used in the optical path control apparatus in the first embodiment. As shown in FIG. 6A, a silicon wafer 6 has the diameter of 6 inches, the crystal orientation of the (100) plane, and the thickness of 1 mm. Thermal oxidation films 7 are formed on the both sides of the silicon wafer to have the thickness of 1 $\mu$m. Next, as shown in FIG. 6B, a photoresist layer 8 is coated on one side of thermal oxidation films 7 to have the thickness of 5 $\mu$m. After exposure is carried out through a predetermined mask, development, rinsing by water, and patterning are carried out to form a first opening 9 in the photoresist layer 8. The first opening 9 has the shape of 100×70 $\mu$m. The photoresist layer 8 with the first opening 9 is immersed in buffered fluoric acid so as to etch thermal oxidation film 7 on the surface of the silicon wafer 6.

Figure 6C:
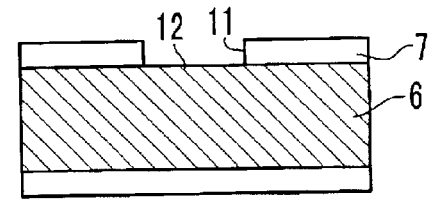
Figure 6D:
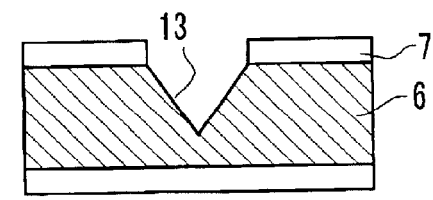
Figure 6E:
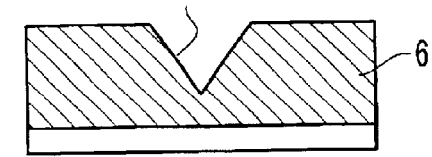
Figure 7A:
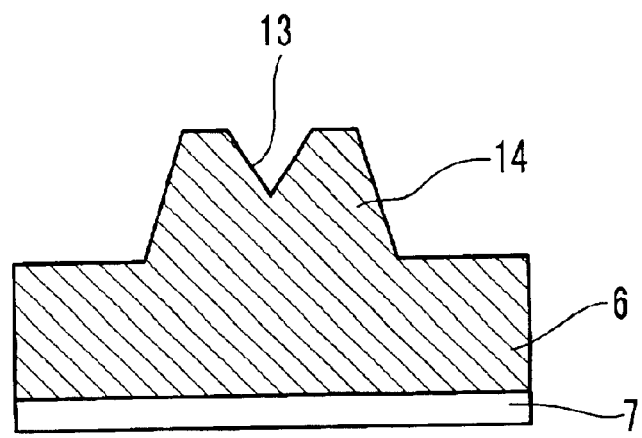
FIG. 7A is a cross sectional view showing a modification example of the manufacturing method of the mirror section and FIG. 7B is a plan view of the mirror section.

Next, as shown in FIG. 6C, after water-rinsing, the photoresist layer 8 is removed with solvent and is rinsed. Thus, a second opening 11 is formed in the thermal oxidation film 7 so that an exposed surface 12 is formed on the silicon wafer 6. As shown in FIG. 6D, the exposed surface of silicon wafer 6 through the second opening 11 is subjected to anisotropic etching with potassium hydroxide solution. Thus, a concave section 13 is formed to have the crystal orientation of the (111) plane and a square pyramid cross section. Then, as shown in FIG. 6E, the whole of thermal oxidation film 7 on the side of the silicon wafer 6 where the concave section 13 is formed is etched with the buffered fluoric acid. Here, as shown in FIG. 7A, a convex section 14 may be formed on the silicon wafer 6 as a die and the concave section 13 may be formed in the convex section 14, considering the installation.

Figure 6F:
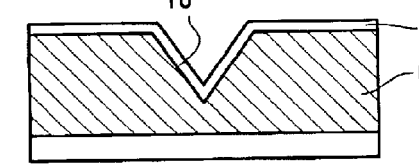
Figure 6G:
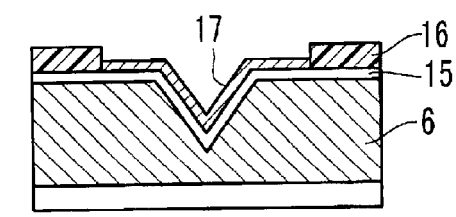
Figure 7B:
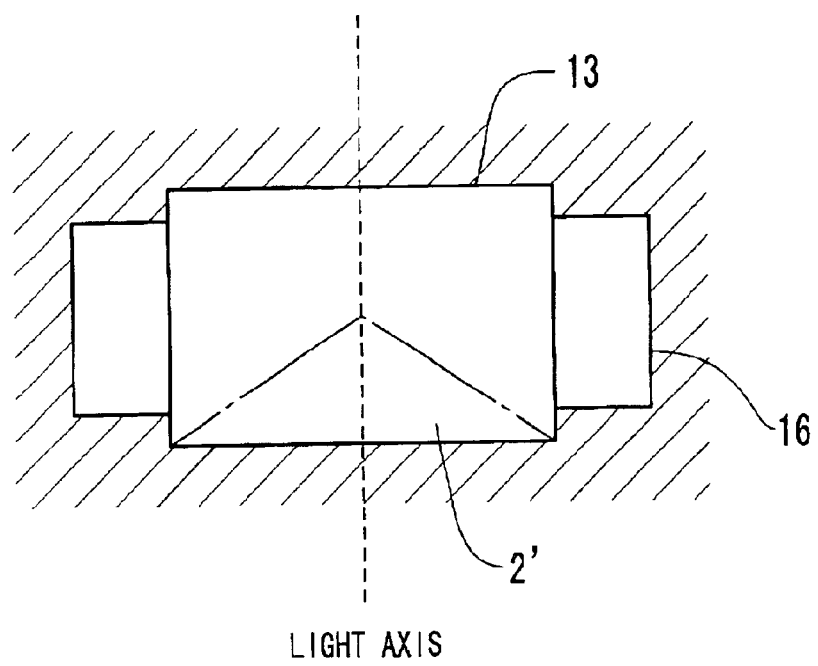

Next, as shown in FIG. 6F, a copper sputtering film 15 is formed on the surface of the silicon wafer 6 where the concave section 13 is formed, to have the thickness of 1 $\mu$m. Then, as shown in FIG. 6G, a photoresist layer 16 is coated on the surface of the copper sputtering film 15, and is exposed, developed and patterned to have an opening. The opening contains the concave section 13 and connection sections extending from the concave section 13 in the left and right direction, as shown in FIG. 7B. Here, the connection sections provided for the substrate 1 extend in the directions other than a light incident direction (the light axis is shown by the dotted line).

Figure 6H:
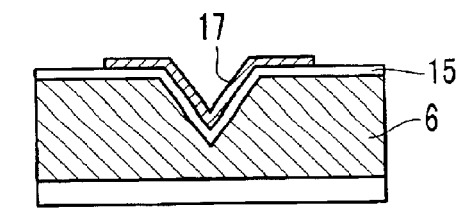

Next, an Au plating film 17 is formed on the copper sputtering film 15 by an electrolysis plating method to have the thickness of 5 μm. Next, as shown in FIG. 6H, the photoresist layer 16 is removed with solvent, and is soaked in the etching liquid of sulfuric acid of 5% and hydrogen peroxide water of 5% to etch the copper sputtering film 15 by 0.8 μm. Through this step, the copper sputtering film 15 becomes thin, resulting in the reduction of stress when the mirror section 2 is transferred in the subsequent process and decrease of fault.

When the mirror section 2 is formed to have the square pyramid shape or the triangular prism shape, it is possible to have a bent line. The pyramid or prism shape can be formed by an etching method, considering of the crystal orientation of the substrate. Therefore, the mirror surface has highly precise surfaces.

Figure 8A:
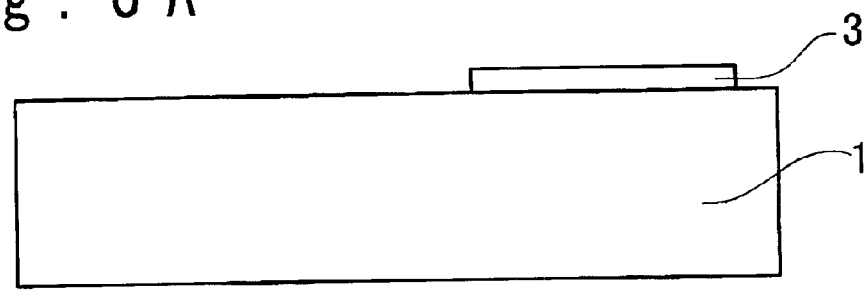
FIGS. 8A to 8C are cross sectional views showing a method of installing the mirror section on the optical path control apparatus in the first embodiment.
Figure 8B:
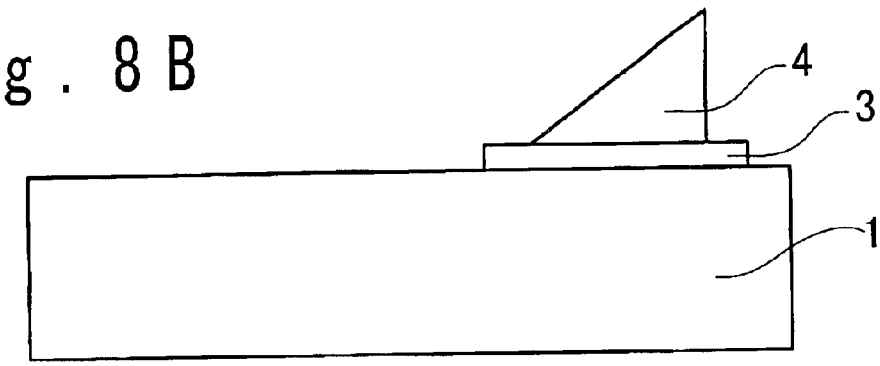
Figure 8C:
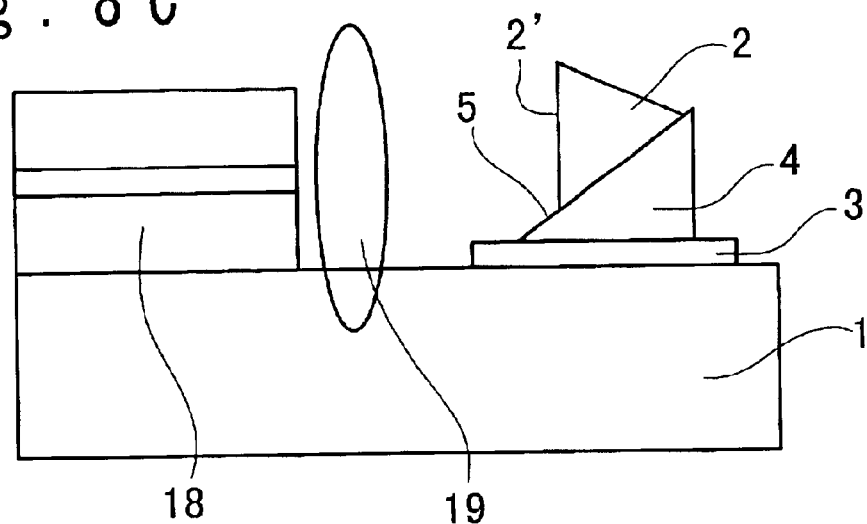

FIGS. 8A to 8C show a method of installing the mirror section 2 in the optical path control apparatus in the first embodiment. Especially, FIGS. 8A to 8C show the method of joining the gear 3 and the base section 4 with a triangular prism shape to the substrate 1. The gear 3 and the base section 4 can be made by the above-mentioned LIGA process using X-ray lithography and an electroplating method. The gear 3 and the base section 4 are both formed of Ni and are subjected to an Au plating method.

As shown in FIG. 8A, the gear 3 is installed on the substrate 1. Next, as shown in FIG. 8B, the base section 4 is formed on the substrate 1 by the X-ray lithography to be rotatably. The base section 4 is joined on the surface of the gear 4 with solder. Next, as shown in FIG. 8C, the silicon wafer 6 shown in FIG. 6H and the base section 4 are adjusted in position and coupled to each other by a coupling tool (not shown). The Au plating film 17 of the mirror section 2 is joined to the slope 5 of the base section 4, and the silicon wafer 6 as the die is peeled off from the Au plating film 17 in the coupling state. Then, the copper sputtering film 15 on the surface of the Au plating film 17 is etched and the Au plating film 17 is exposed. The reflection surface 2' of the Au plating film 17 is one of four surfaces (the bottom of the mirror section is opened). Next, an optical fiber 18 and a lens 19 are installed in target positions.

Figure 9:
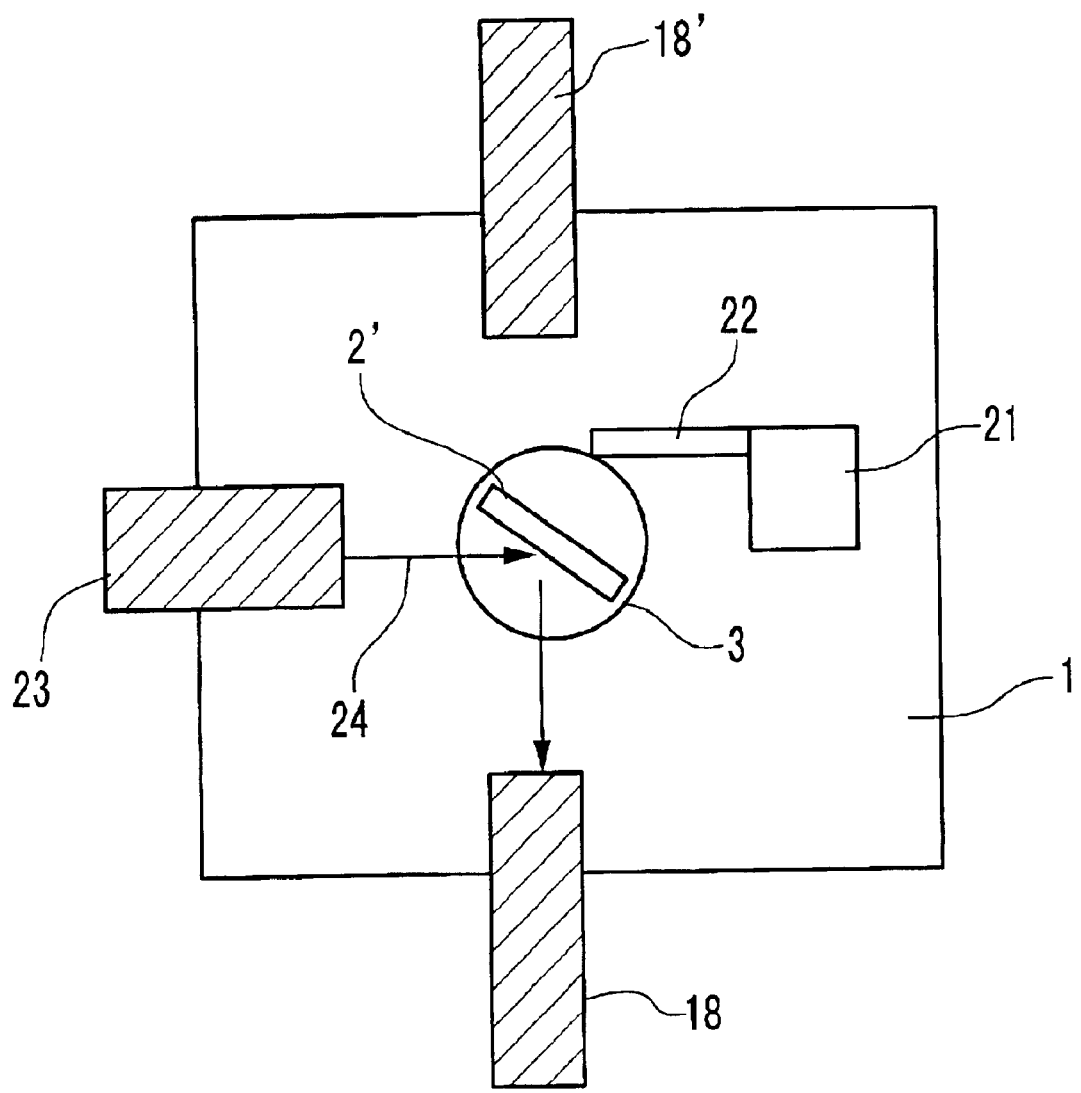
FIG. 9 is a plan view showing the installing method shown in FIGS. 8a to 8C in detail.

As shown in FIG. 9, an electrostatic actuator 21 and a rack 22 are arranged on the substrate 1. The rack 22 transfers the linear movement of the electrostatic actuator 21 to the gear 3 to convert the linear movement of the electrostatic actuator 21 into the rotary movement of the gear 3. A displacement quantity of the electrostatic actuator 21 is strictly controlled. Thus, it is possible for the output light 24 from the laser diode (LD) 23 to be incident correctly to the end of the optical fiber 18 at a right angle with a sufficient precision. When the gear 3 is correctly rotated 90 degrees, the output light can be inputted to another other optical fiber 18' opposing to the optical fiber 18. The reflection loss of the reflection surface 2' of the mirror section 2 is about 0.1 dB and it is a sufficiently low value. As a result, the rotation angle control of the reflection surface 2' of the mirror section 2 by the electrostatic actuator 21 is in a sufficiently high precision. By changing the concave surface angle of the concave section 13 at the step of FIG. 6D, the angle between the reflection surface 2' and the substrate surface can be freely changed.

Figure 10:
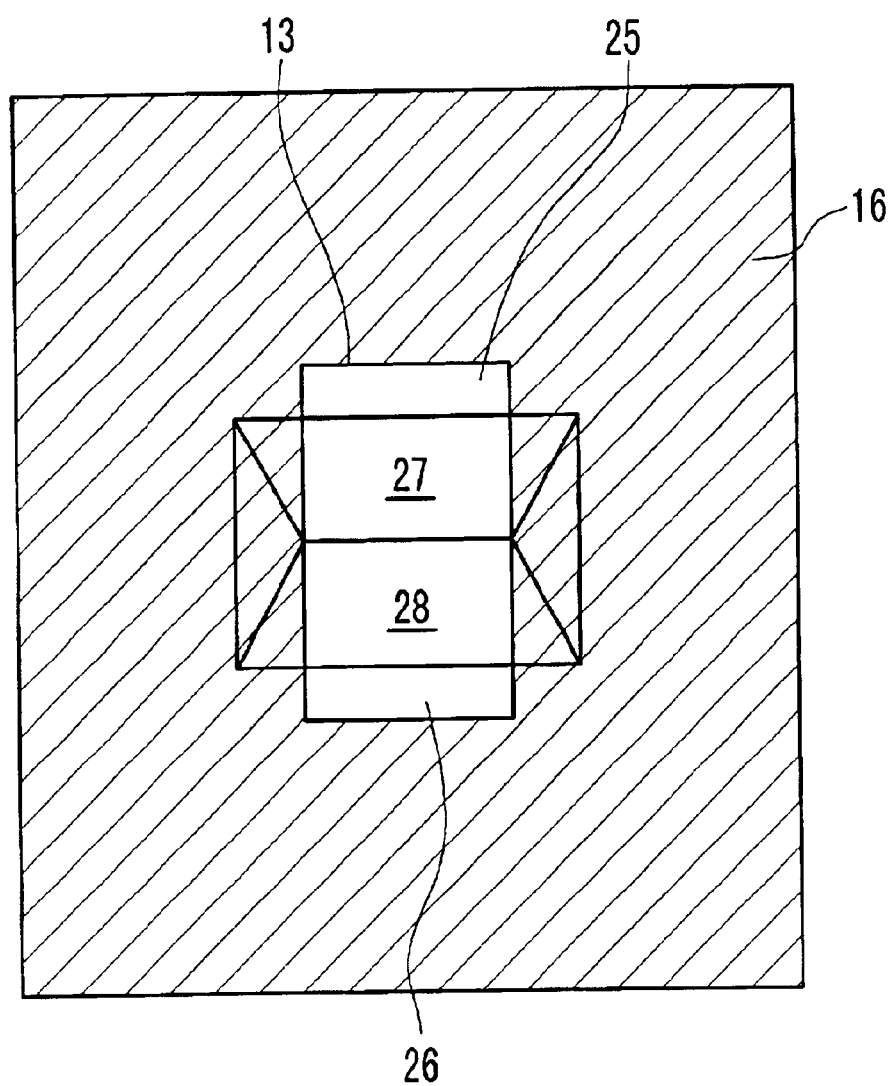
FIG. 10 is a plan view showing a die used in the manufacturing method of the optical path control apparatus of the present invention.

FIG. 10 is a plan view showing the die used in the manufacturing method of the mirror section 2 in the optical path control apparatus of the present invention. The opening formed by the photoresist layer 16 of FIG. 6G is changed as shown in FIG. 10. The opening portion has connection section forming sections 25 and 26 of both sides, and two reflection surfaces 27 and 28. Therefore, side walls are not formed. The mirror section 2 formed using the die shown in FIG. 10 is installed as shown in FIG. 11. The connection sections corresponding to the connection section forming sections 25 and 26 are joined to the substrate 1 and a moving section 21. The reflection surfaces 29 and 31 are formed symmetrically with respect to a symmetrical plane 30.

A part of the substrate 1 is formed to have a lower portion on which an actuator 21 as the moving section is arranged in a direction orthogonal to the symmetrical plane 30. One 27 of the connection sections is fixed to the substrate 1 and the other connection section 28 is fixed to the surface of the electrostatic actuator 21. The connection sections 27 and 28 are placed on the same plane. The actuator 21 can move by about 100 μm linearly in opposite directions. Both of the reflection surfaces 29 and 31 of the mirror section 2 have thin bending portions so that the bending displacement is easy.

Figure 12A:
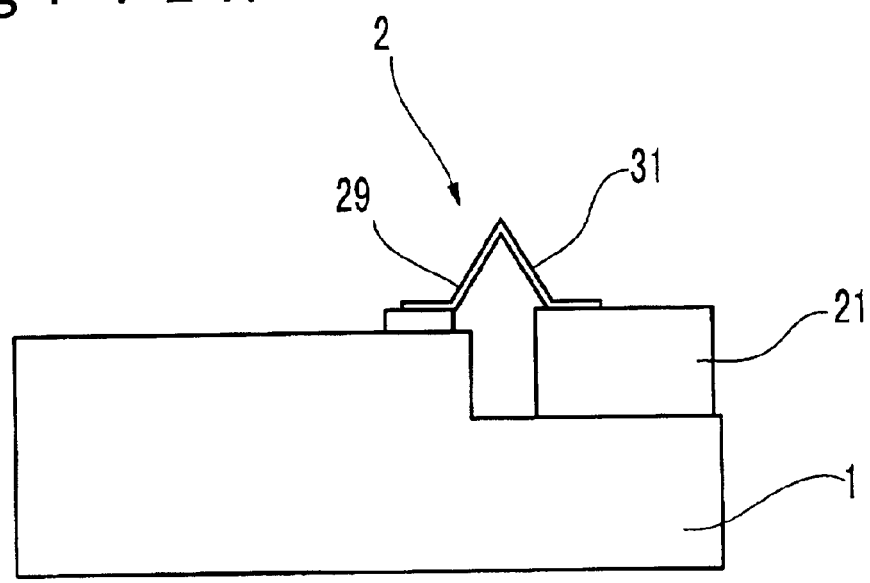
FIGS. 12A and 12B are cross sectional views showing the operating state of the optical path control apparatus in the second embodiment.
Figure 12B:
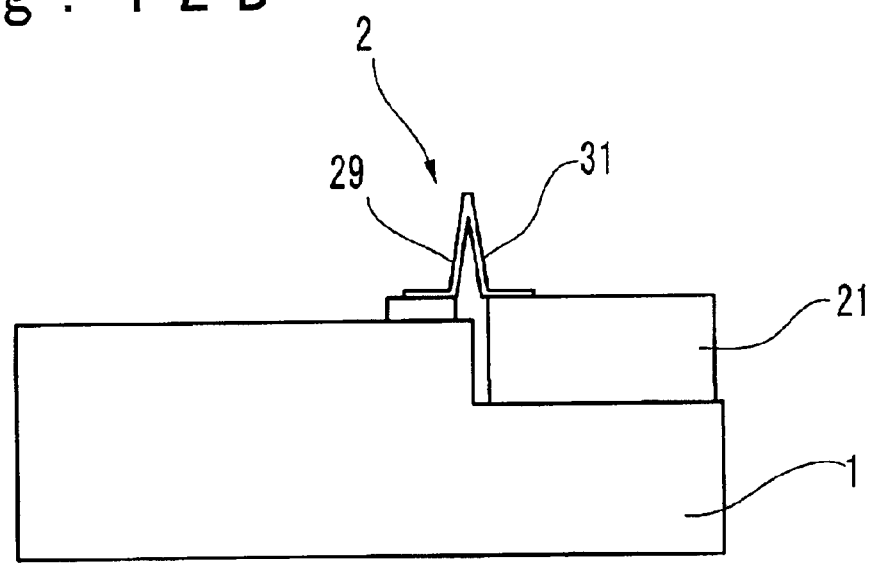
Figure 13:
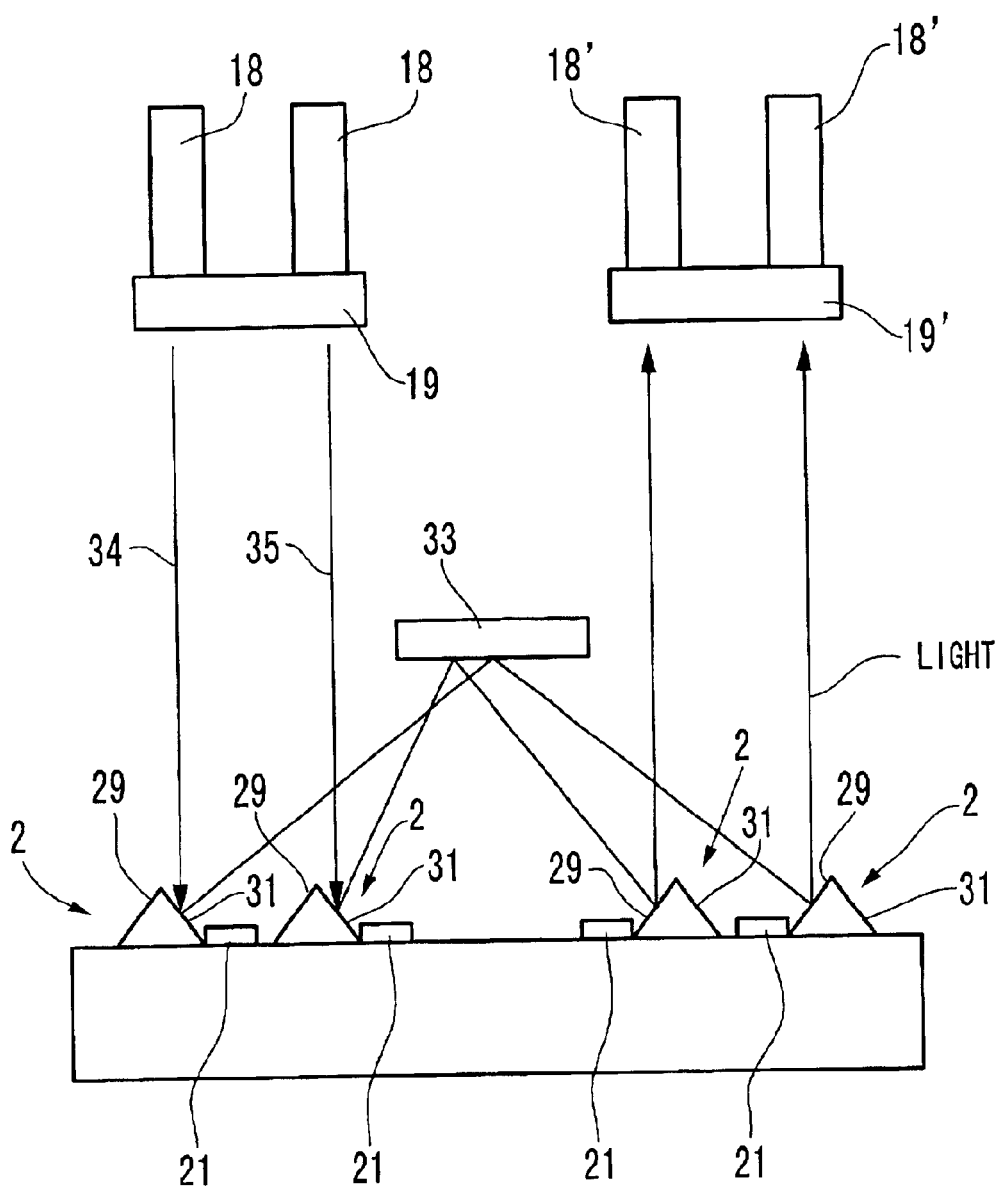
FIG. 13 is a cross sectional view showing a light switch as the optical path control apparatus according to a third embodiment of the present invention.

As shown in FIGS. 12A and 12B, the electrostatic actuator 21 can move in opposite directions, and each of the reflection surfaces 29 and 31 has different reflection angles on the position of the electrostatic actuator 21 apart from the connection section 29 and on the close position to the connection section 29. FIG. 13 shows the light switch using four mirror sections 2, each of which can change the reflection angle. The four mirror sections 2 are individually and respectively driven by four electrostatic actuators 21, in the way described above. Two output side optical fibers 18 and the input side optical fibers 18' are optically connected through lenses 19 and 19', the mirror sections 2 and a reflection mirror 33.

The output light 34 outputted from one of the output side optical fibers 18 is reflected by the reflection surface 31 of a first mirror section 2, is reflected by the reflection mirror 33, is reflected by another reflection surface 29 of the fourth mirror section 2 and then is inputted to one of the input side optical fibers 18'. The output light 35 outputted from the other output side optical fiber 18 is reflected by the reflection surface 31 of the second mirror section 2, is reflected by the reflection mirror 33, and is reflected by another reflection surface 29 of the third mirror section 2 and then is inputted to the other input side optical fiber 18'. By moving the electrostatic actuator 21 between the two positions, one of two input side optical fibers 18' can be selected to input the output light 34 or 35 via the two reflection surfaces of the mirror sections 2. Thus, the optical path control apparatus is simplified in structure.

Figure 14:
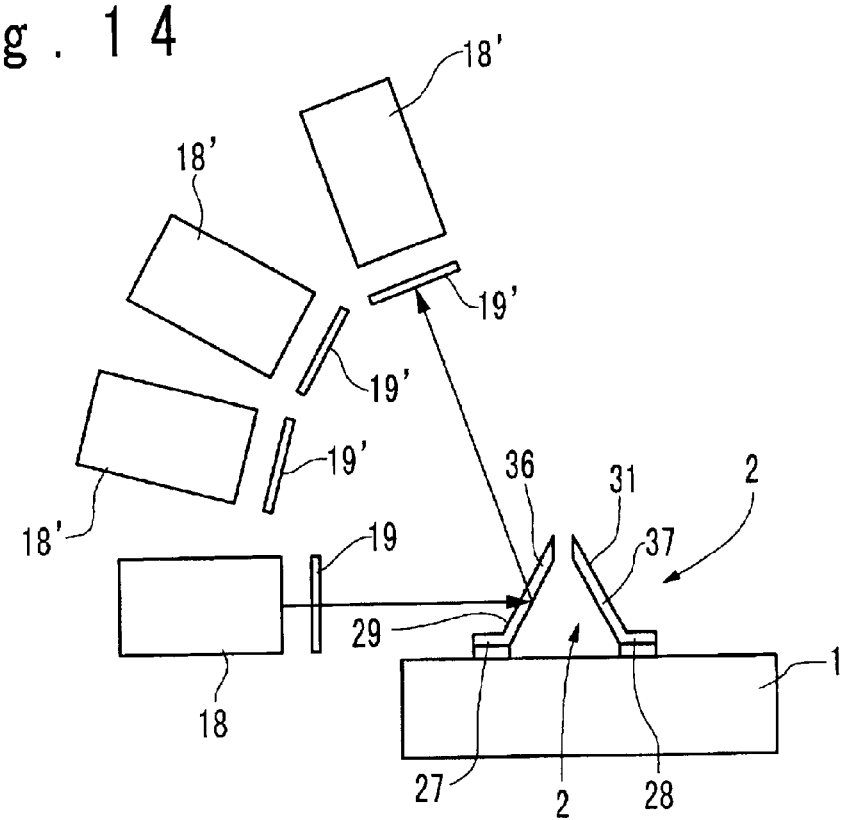
FIG. 14 is a cross sectional view showing the mirror section used in the optical path control apparatus according to a fourth embodiment of the present invention.

FIG. 14 is a front view showing the mirror section used in the optical path control apparatus according to the fourth embodiment of the present invention. The vertex portion of the mirror section 2 shown in FIG. 11 (one of the bending portions described above) is removed and the connection sections 27 and 28 are both fixed to the substrate 1. Wires (not shown) are attached to the rear sides of the mirror portions 36 and 37 obtained by dividing the mirror section 2. By flowing current on each wire, the both mirror portions 36 and 37 are displaced with attractive or repelling force which is proportional to the current. Thus, the angle of each of the reflection surfaces 29 and 31 of the mirror portion 36 and 37 is changed. In this way, the output side optical fiber 18 is connected optically with either of the input side optical fibers 18 which are arranged around the mirror section 2. Such a mirror section 2 can be moved in small displacement force and the displacement speed is high.

Figure 15:
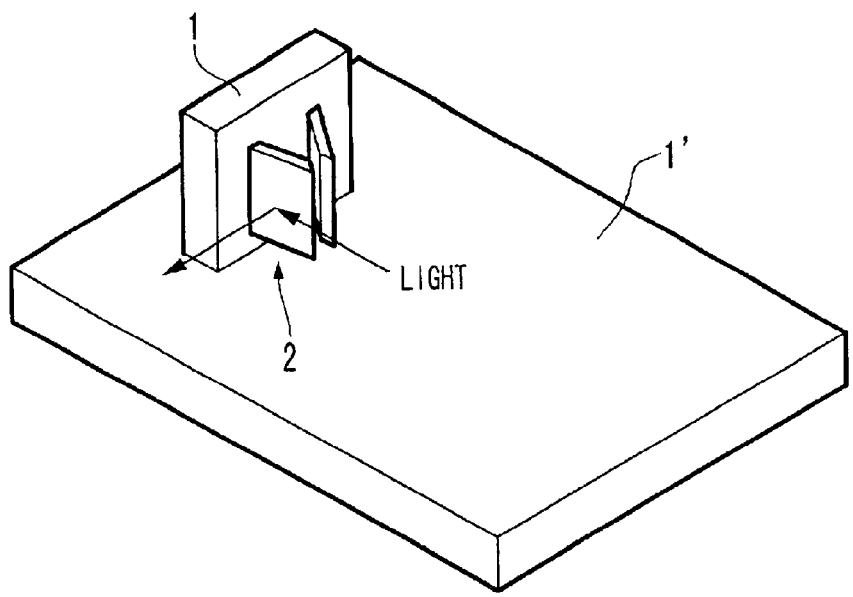
FIG. 15 is a perspective view showing the installation state of the mirror section in the fourth embodiment.

As shown in FIG. 15, the substrate 1 of FIG. 14 is joined to a large substrate 1'. The substrate surface of the substrate 1 is orthogonalized to the substrate surface of the large substrate 1'. If the substrate 1 can be joined to the large substrate 1' at the right angle, the light axes of the optical fibers 18 and 18' of FIG. 14 can be arranged in parallel to the substrate surface of the large substrate 1'. The light switch circuit can be formed on the plane which is defined by the large substrate 1'.

Figure 16A:
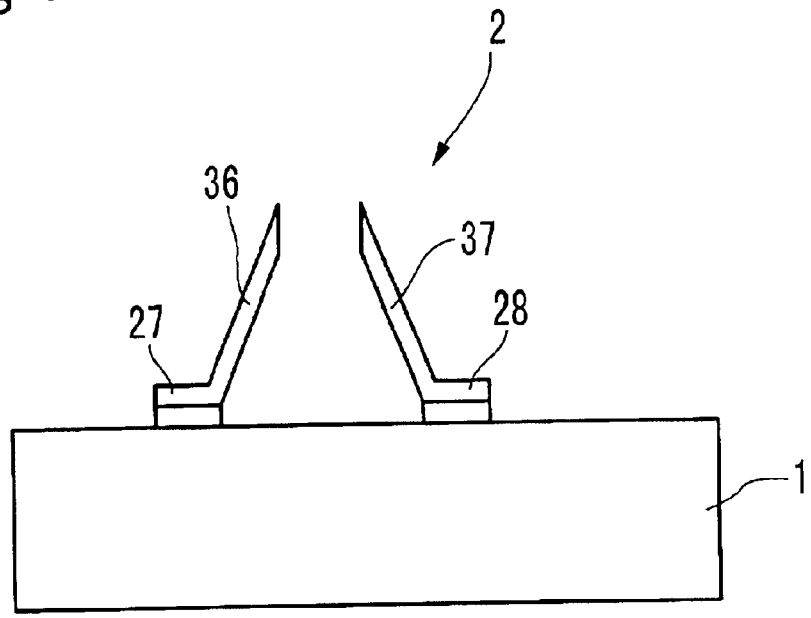
FIGS. 16A and 16B are cross sectional views showing two operating states of the mirror section shown in FIG. 14.
Figure 16B:
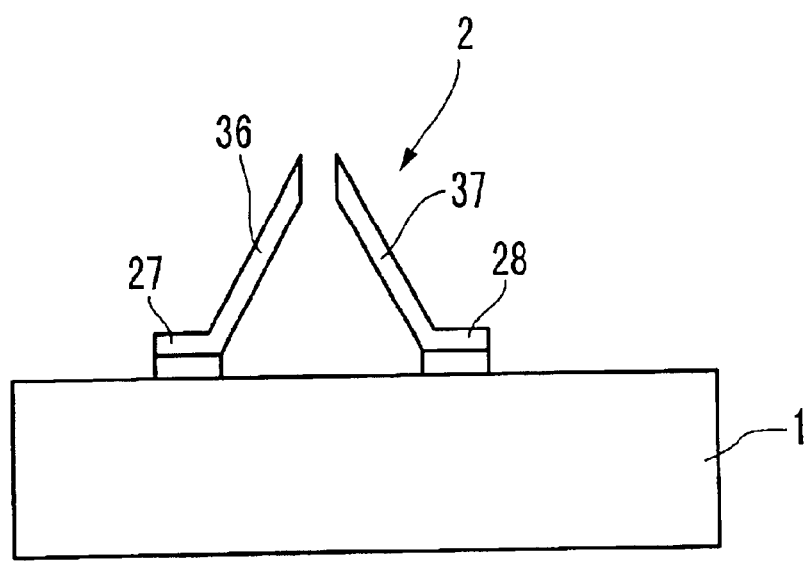

FIGS. 16A and 16B show the operating states of the optical path control apparatus according to the fourth embodiment of the present invention. The vertex portion of the mirror section 2 shown in FIG. 11 is removed to divide the mirror section 2 into the mirror portions 27 and 28 which are fixed to the substrate 1. The reflection angles of mirror portions 36 and 37 can be changed by applying positive and negative potentials to the mirror portions 36 and 37. FIG. 16A shows a case where the mirror portions 36 and 37 repel each other through voltage application with the common positive or negative polarity. FIG. 16B shows a case where the mirror portions 36 and 37 attract each other through positive or negative voltage application. Through the drive of such mirror portions, the light switch is formed or the optical circuit can be formed freely.

Figure 17A:
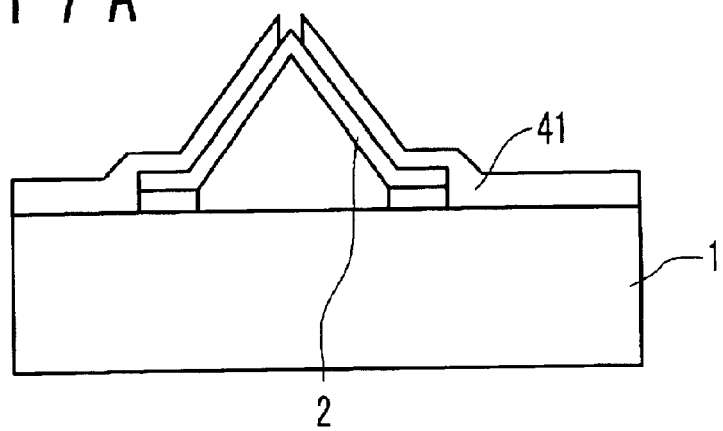
FIGS. 17A to 17C are cross sectional views showing a manufacturing method of the mirror section in the fourth embodiment.
Figure 17B:
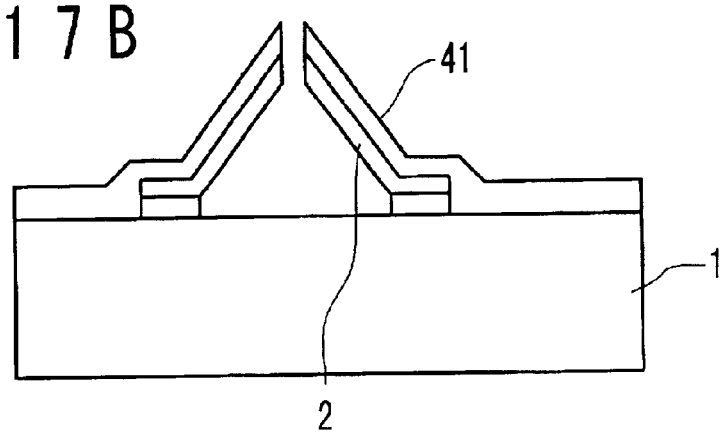
Figure 17C:
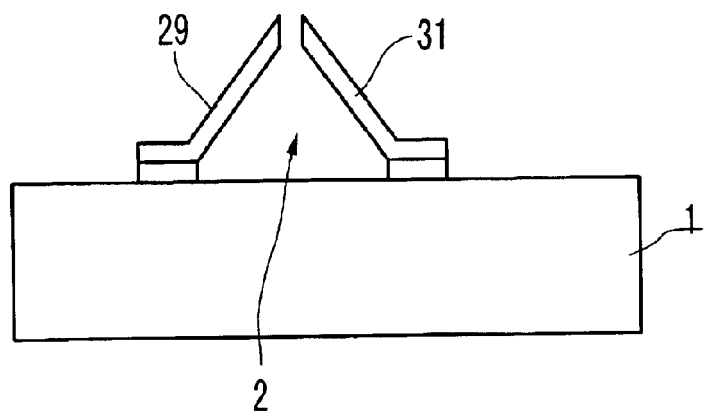

FIGS. 17A, 17B and 17C are cross sectional views showing a manufacturing method of the mirror section in the fourth embodiment. As shown in FIG. 17A, the mirror section 2 of FIG. 11 formed using the forming die shown in FIG. 10 is joined onto the substrate 1. In the state shown in FIG. 17A, the Au film surface is already exposed by the etching process as mentioned above. A resist layer 41 is formed by spraying the surface of the mirror section 2 and the substrate 1 by a spray unit (not shown). The resist layer 41 is patterned and the vertex section of the mirror section 2 is exposed. Next, as shown in FIG. 17B, the mirror vertex section is removed by an ion beam etching method. Next, as shown in FIG. 17C, the resist layer 41 is peeled off and the mirror section 2 of the divisional type shown in FIGS. 14 and 15 can be formed. These surfaces 29 and 31 of the mirror section 2 can be used as the reflection surfaces.

Figure 18:
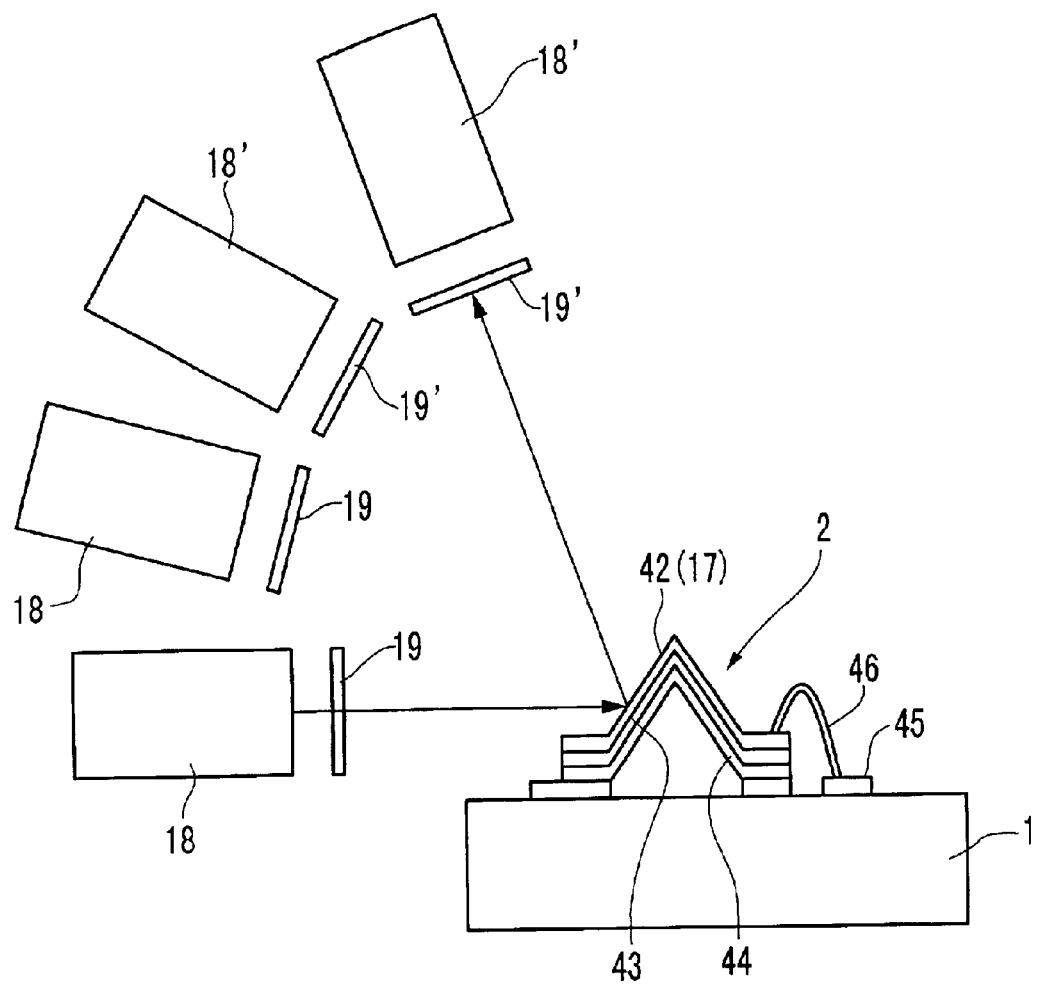
FIG. 18 is a cross sectional view showing the optical path control apparatus according to a fifth embodiment of the present invention.
Figure 19A:
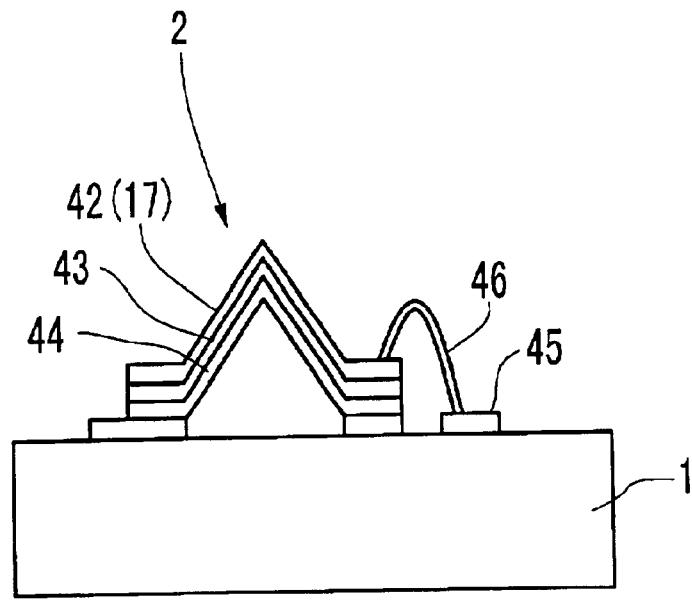
FIGS. 19A and 19B are cross sectional view showing the operating state of the mirror section used in the optical path control apparatus according to the fifth embodiment of the present invention.
Figure 19B:
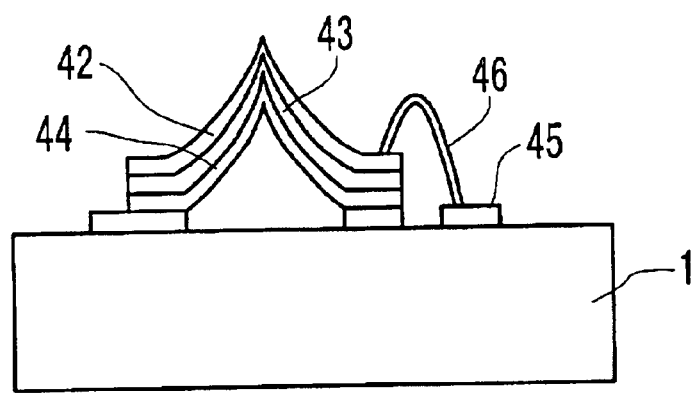

FIG. 18 is a front view showing the optical path control apparatus according to the fifth embodiment of the present invention. The mirror section 2 is formed as a laminate film in which a mirror layer 42 with two reflection surfaces, a piezoelectric layer 43 and an electrode layer 44 are laminated. The piezoelectric layer 43 is formed under the mirror layer 42. The electrode layer 44 is formed under the piezoelectric film 43. Each of the mirror layer 42, the piezoelectric film 43 and the electrode layer 44 of the laminate layer has connection sections on both sides, like the above-mentioned mirror section 2 of FIG. 11. The laminate layer is joined as a whole to the substrate 1. An electrode 45 is formed on the substrate 1 and the electrode 45 and the connection section of the mirror section 2 are electrically connected by a bonding wire 46. By applying a voltage between the electrode layer 44 of the connection section and the electrode 45, the piezoelectric film 43 is bent so that the inclined angle of the mirror layer of the mirror section 2 is changed, as shown by FIGS. 19A and 19B. In this way, the inclined angle of the mirror layer surface of the mirror section 2, i.e., the reflection angle can be correctly controlled based on the voltage control.

Figure 20A:
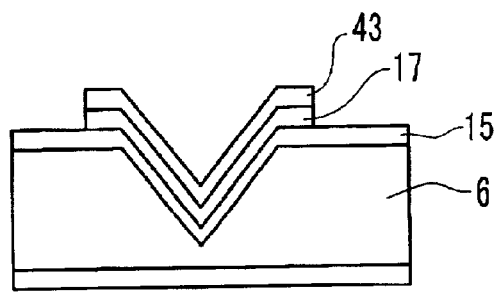
FIGS. 20A to 20D are cross sectional views showing a manufacturing method of the mirror section used in the optical path control apparatus in the fifth embodiment.
Figure 20B:
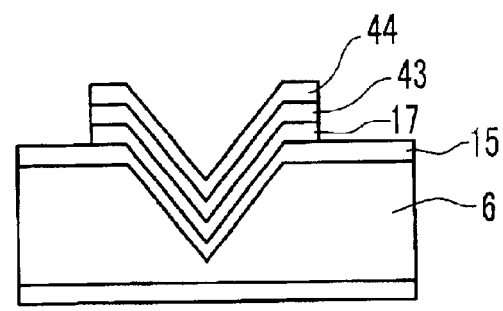
Figure 20C:
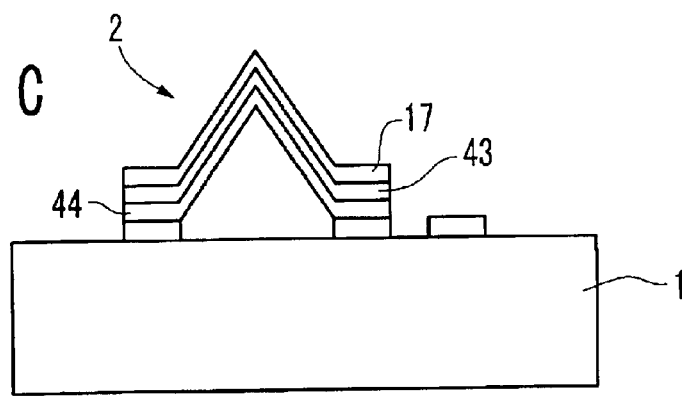
Figure 20D:
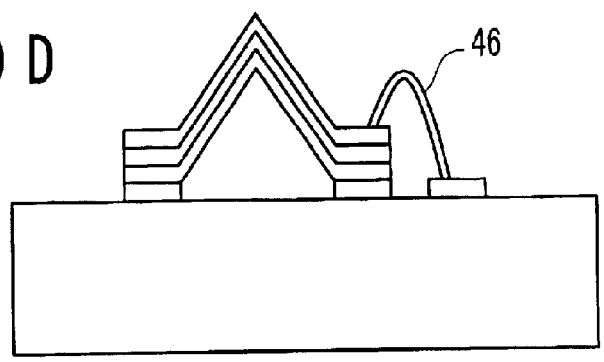

FIGS. 20A to 20D is cross sectional views showing a manufacturing method of the mirror section used in the optical path control apparatus according to the fifth embodiment of the present invention. Especially, the manufacturing method of the mirror section 2 of FIG. 18 is shown. Subsequently to the step of FIG. 6E, a copper sputtering film 15 is formed on the silicon wafer 6 as the forming die and a resist layer is coated and patterned. Subsequently, an Au plating film 17 is formed on the surface of the copper sputtering film 15 and the resist layer is peeled off. Next, as shown in FIG. 20A, the piezoelectric layer 43 is formed on the Au plating film 17 by a sputtering method to have the thickness of 1 $\mu$m. Then, a resist layer is coated and patterned such that the mirror section 2 is left. Next, as shown in FIG. 20B, the electrode layer 44 as a metal layer is formed on the surface of the piezoelectric layer 43 by a vapor deposition. Then, a resist layer is coated, patterned and peeled off. Next, as shown in FIG. 20C, a laminate layer composed of the electrode layer 44, the piezoelectric layer 43, the mirror layer 17 as the Au plating film and the copper sputtering film 15 is transferred into a predetermined position of the substrate 1. In case of the transfer, the connection sections of the electrode layer 44 are joined to the substrate 1 by solder. Next, the copper sputtering film 15 is removed by the etching as mentioned above. As shown in FIG. 20D, the bonding is carried out as mentioned above, and the mirror section 2 shown in FIG. 18 is installed on the substrate 1.

In place of the piezoelectric film which has such an electrostriction effect, a magnetic film with a magnetostriction effect, an opto-magnetic film with a magnetostriction effect with may be used.

FIG. 21A show the optical path control apparatus according to the sixth embodiment of the present invention. A small substrate 1 is supported movably on the surface of a large substrate 1'. The above-mentioned mirror section 2 is joined on the substrate 1. A supersonic wave generating source such as a piezo-electric device or a semiconductor laser is joined to the large substrate 1'. As shown in FIG. 21B, surface acoustic waves 46 is generated on the surface of the large substrate 1' by the supersonic wave generating source 45. The mirror section 2 can be moved to a target position with progressive waves, and located correctly on the target position by the standing wave. Through the displacement of the mirror section 2, the optical path control circuit can selectively connect the output side optical fiber 18 with one of a plurality of input side optical fibers 18', as shown in FIG. 21A.

Figure 22A:
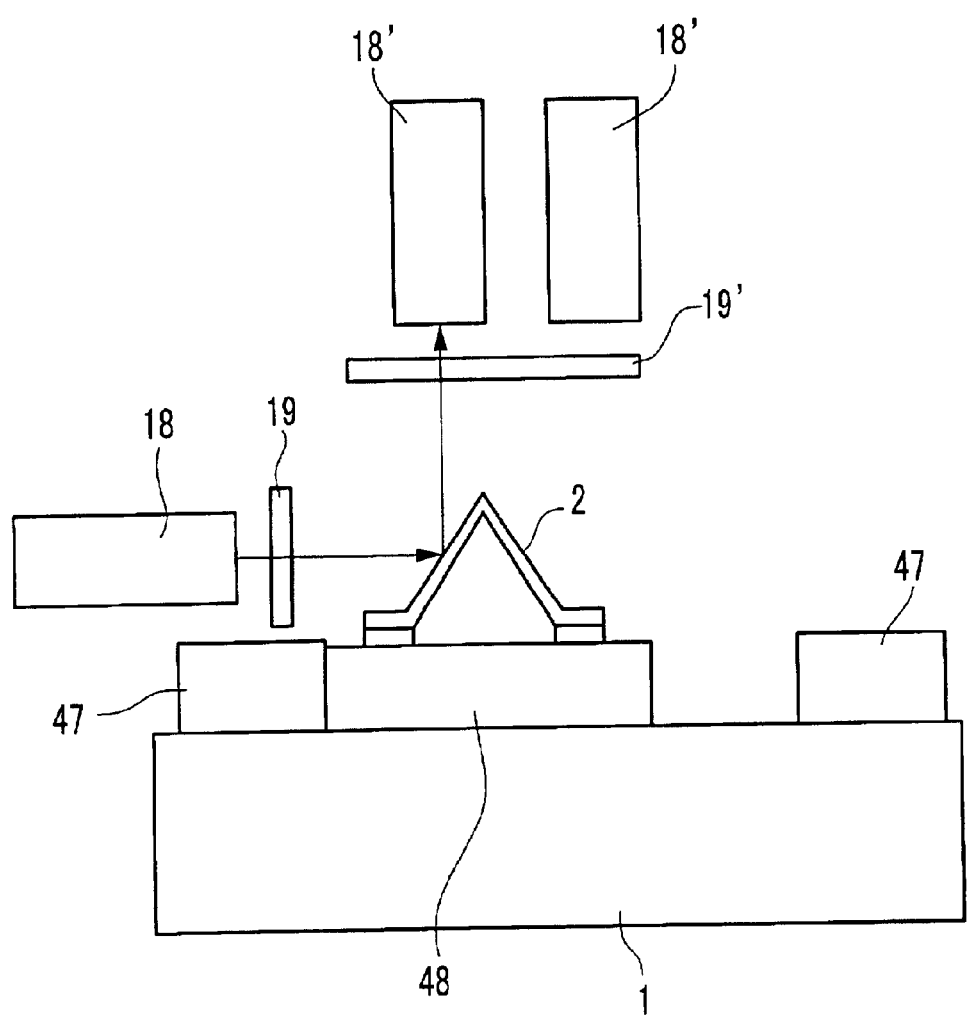
FIGS. 22A to 22C are cross sectional views showing the operation states of the optical path control apparatus according to a seventh embodiment of the present invention.
Figure 22B:
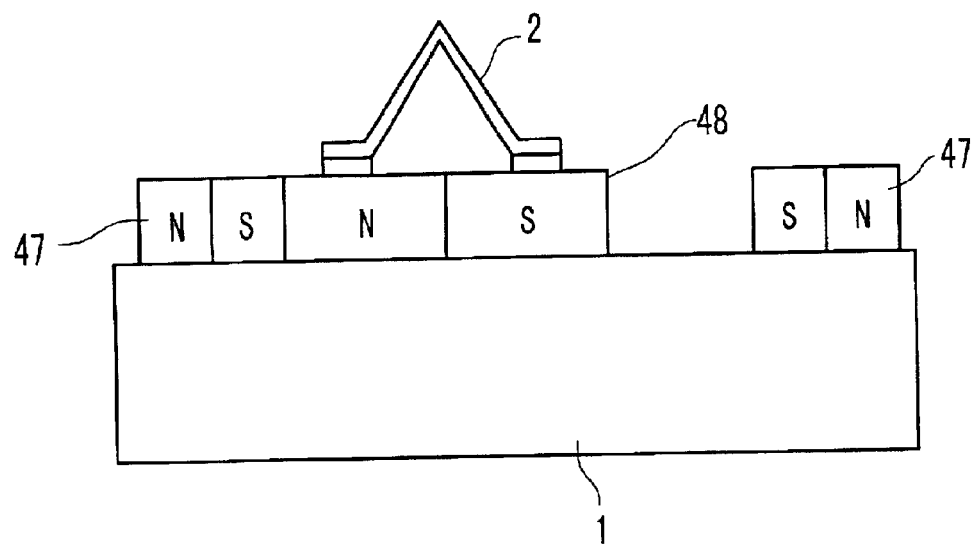
Figure 22C:
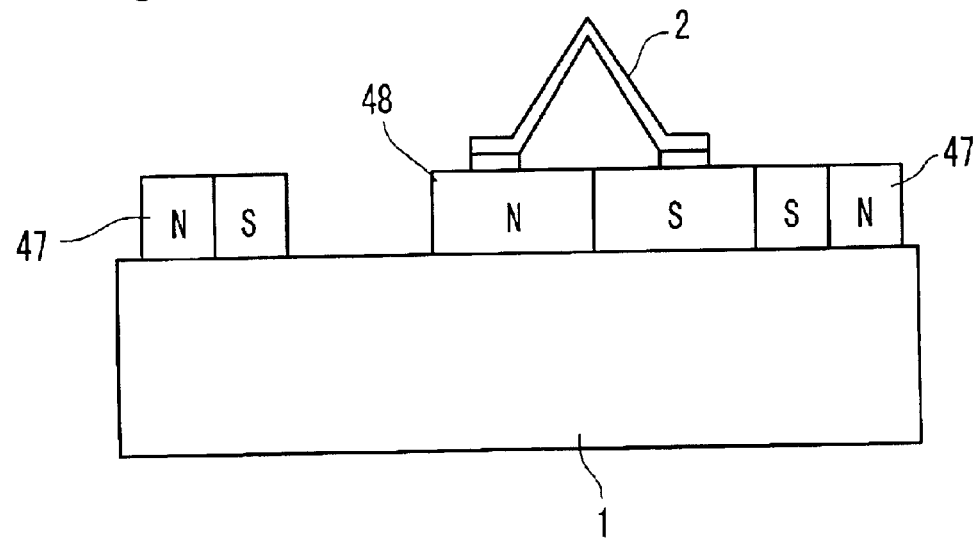

FIG. 22A show the optical path control apparatus according to the seventh embodiment of the present invention. Two electromagnets 47 and one permanent magnet 48 are provided on the substrate 1. The permanent magnet 48 can be displaced slidably on the surface of the substrate 1. The mirror section 2 is installed on the surface of the permanent magnet 48. As shown in FIGS. 22B and 22C, by changing the magnetic polarity of the electromagnets 47, the permanent magnet 48 can move between two positions due to the attractive force and the repelling force by the electromagnets 47. In this way, as shown in FIG. 22A, the optical path control circuit can connect the output side optical fiber 18 with one of the plurality of input side optical fibers 18'.

Figure 23A:
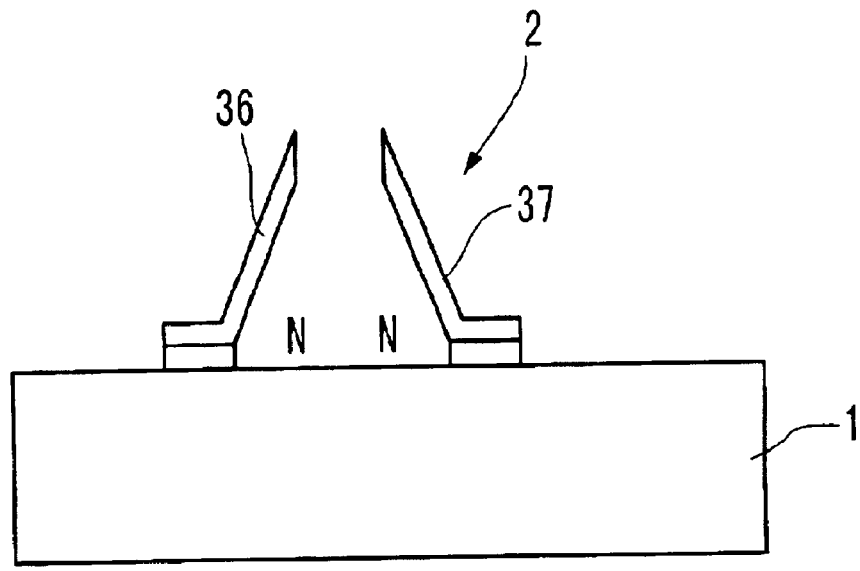
FIGS. 23A and 23B are cross sectional views showing the mirror section used in the optical path control apparatus according to an eighth embodiment of the present invention.
Figure 23B:
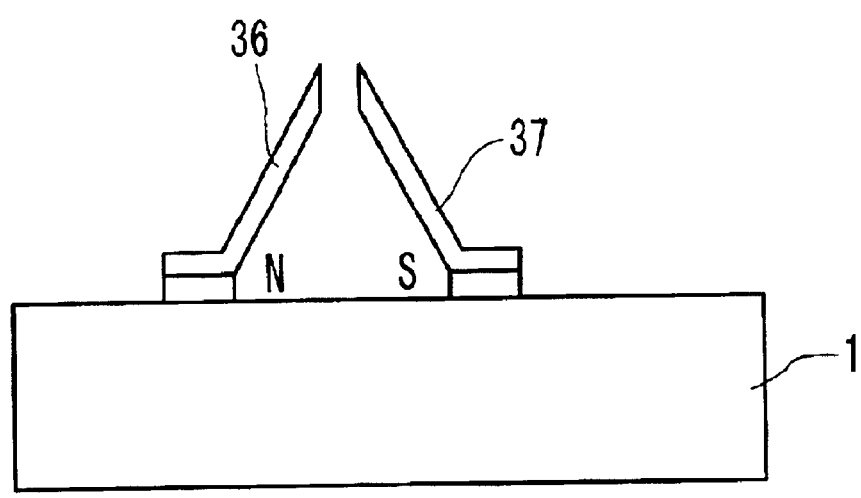

FIGS. 23A and 23B show the operating state of the optical path control apparatus according to the eighth embodiment of the present invention. The mirror section 2 in which the vertex part is removed is used. Magnetic material is used for both of mirror portions 36 and 37. By changing the direction of the magnetization of the mirror portions 36 and 37, the both mirror portions 36 and 37 attract or repel each other, resulting in the change of the reflection surface angle.

Figure 24:
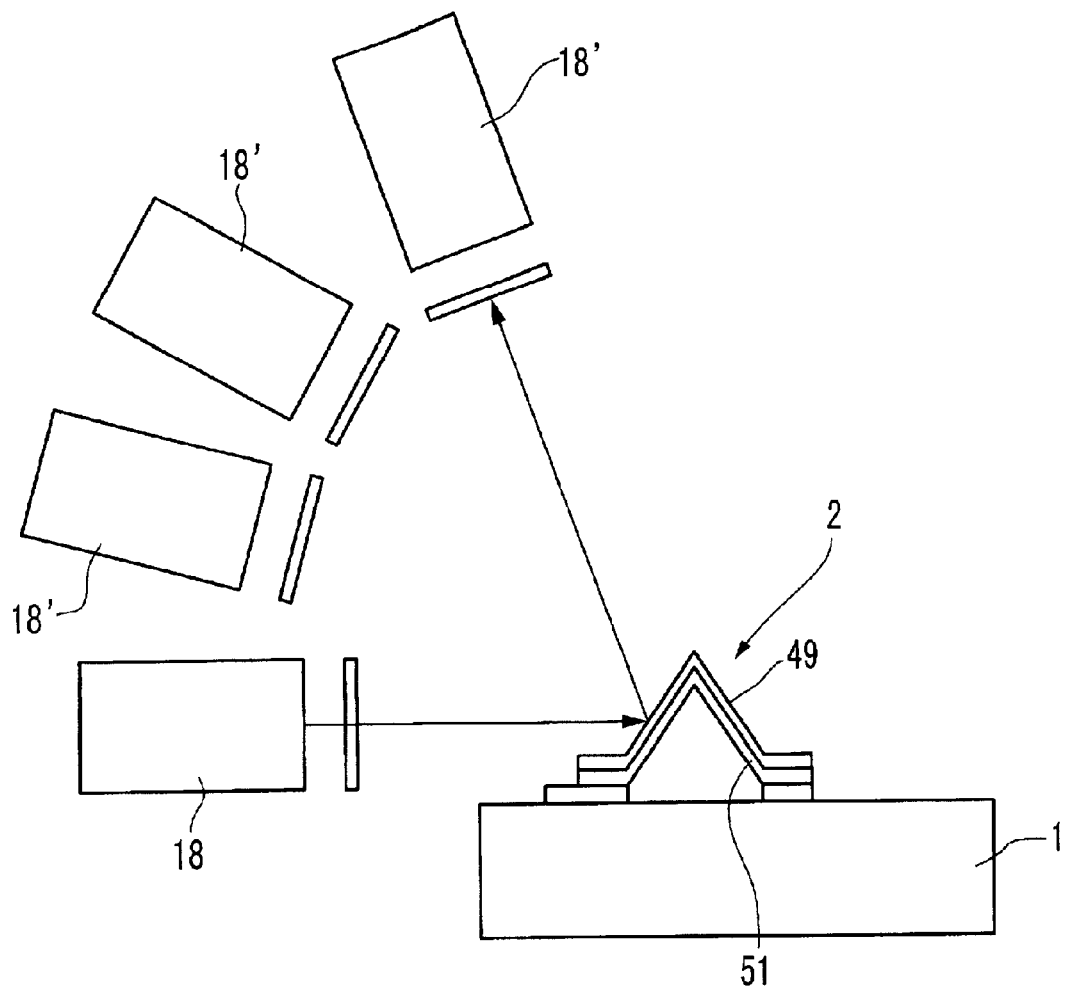
FIG. 24 is a cross sectional view showing the optical path control apparatus according to a ninth embodiment of the present invention.
Figure 25A:
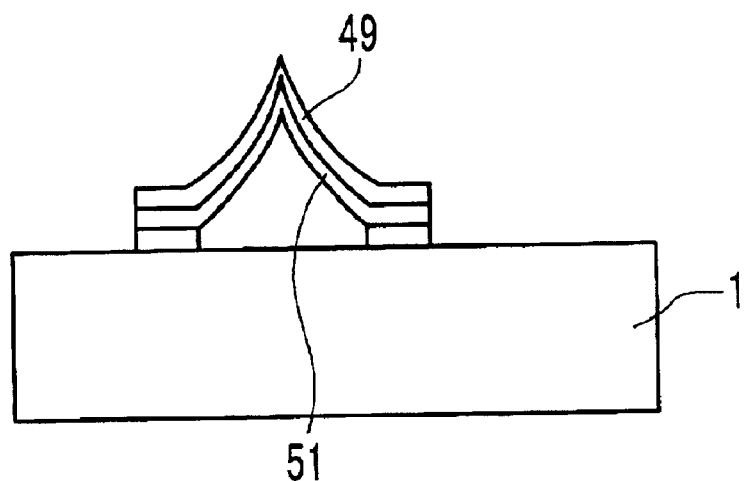
FIGS. 25A and 25B are cross sectional views showing the operating state of the mirror section used in the optical path control apparatus in the ninth embodiment.
Figure 25B:
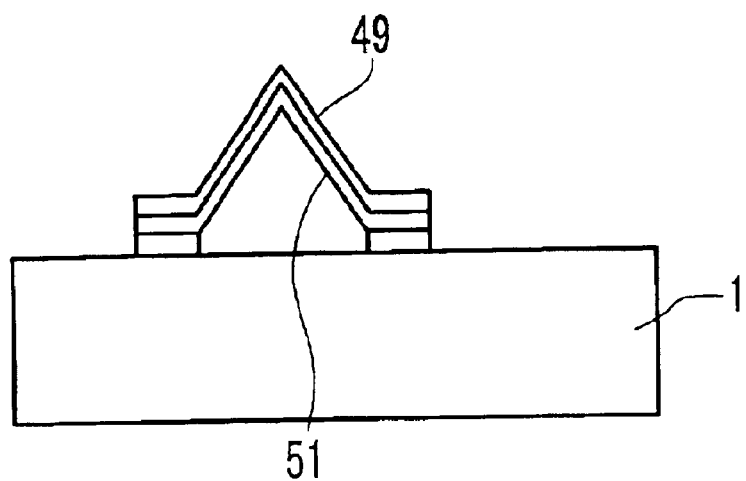

FIG. 24 is a front view showing the optical path control apparatus according to the ninth embodiment of the present invention. The mirror section 2 is formed of the mirror layer 49 with the reflection surfaces and a shape memory alloy layer 51 formed under the mirror layer 49. A resistance circuit is connected with the shape memory alloy layer 51 in the mirror section 2. By supplying current, the shape memory alloy layer 51 can take two temperature states. Thus, as shown in FIGS. 25A and 25B, the shape memory alloy layer 51 can take an initial shape state and a final shape state. The reflection surface angle of the mirror layer 49 is changed between the two shape states. In this way, the optical path control circuit can connect the output side optical fiber 18 to one of the plurality of optical fibers 18'.

Figure 26A:
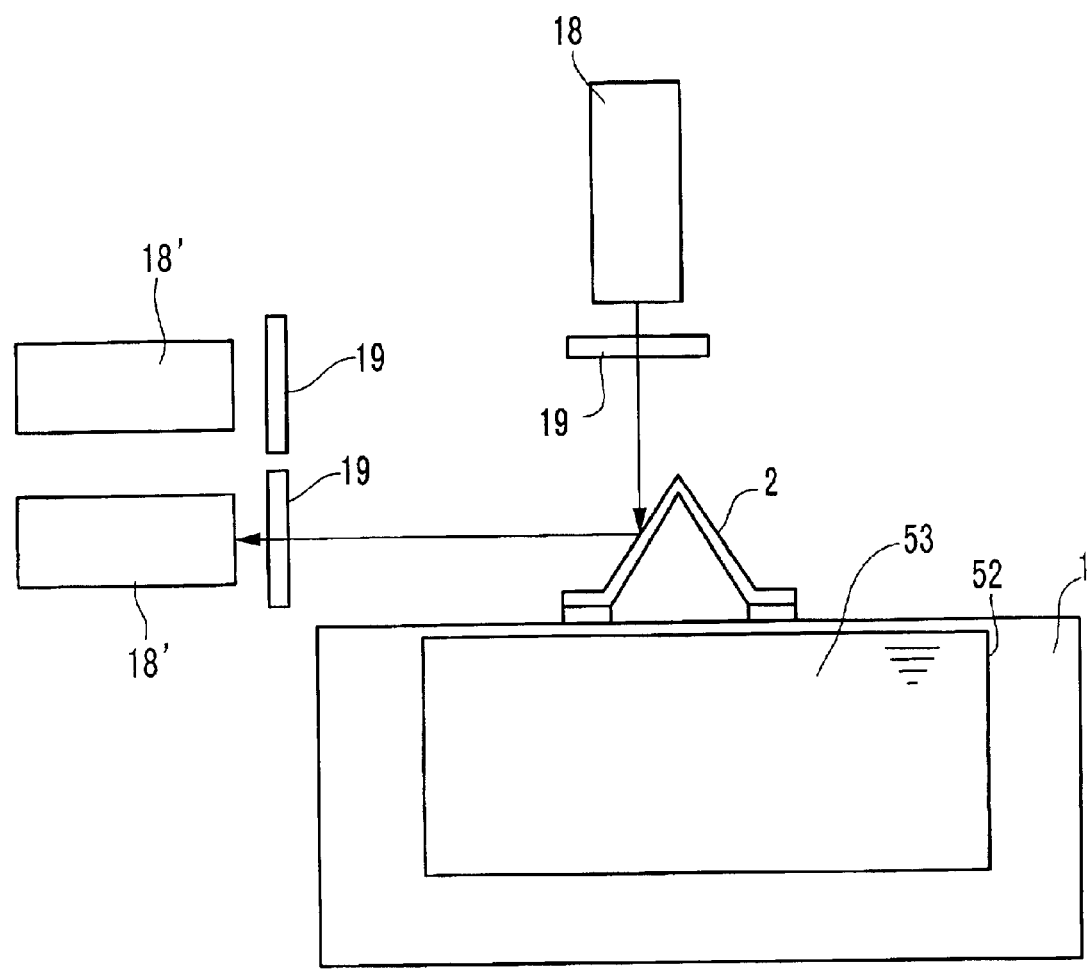
FIGS. 26A to 26C are cross sectional views showing the operating state of the optical path control apparatus according to a tenth embodiment of the present invention.
Figure 26B:
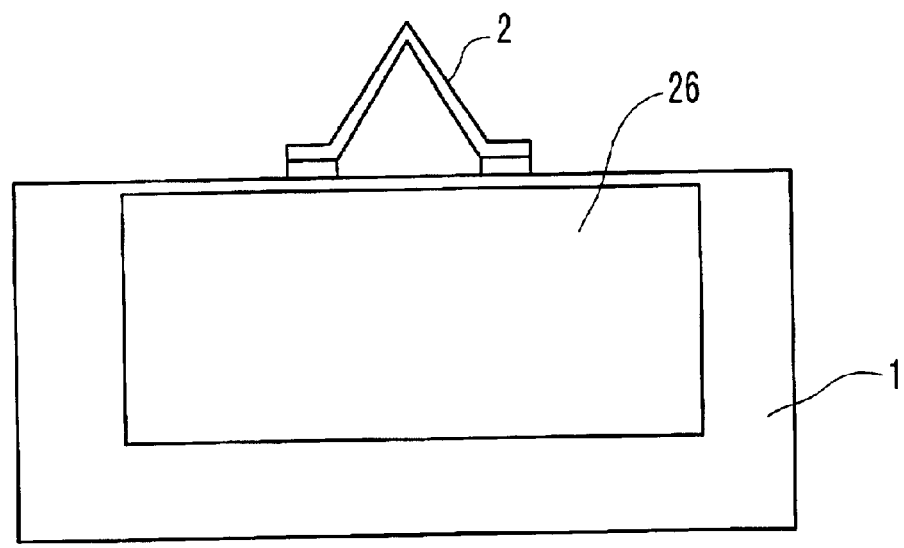
Figure 26C:
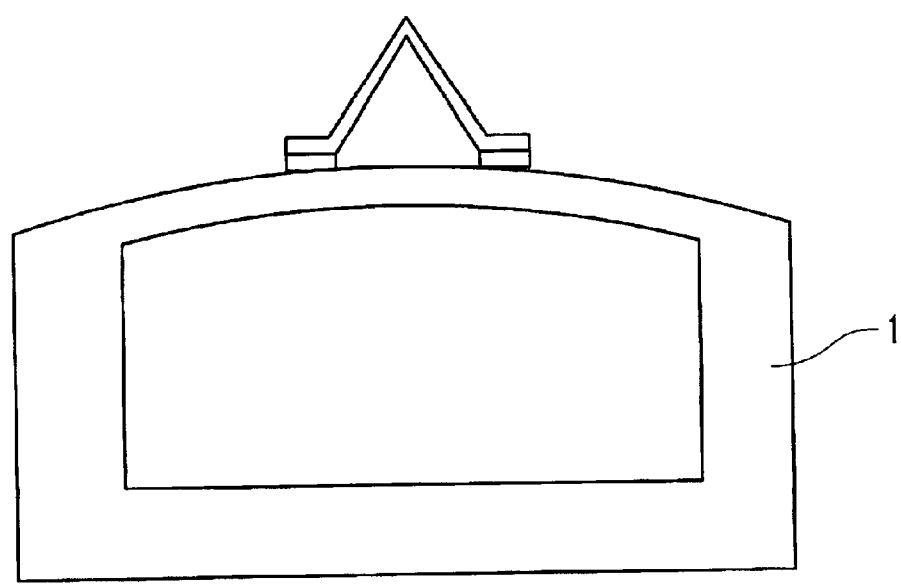

FIG. 26A show the optical path control apparatus according to the tenth embodiment of the present invention. A heat change cell 52 is provided inside the substrate 1, and filled with liquid 53. By heating the liquid, the pressure in the cell 52 changes, and the substrate 1 is transformed. As a result, the transformation changes the mirror section 2 in height. Thus, the mirror section 2 can take two states through heating the liquid, as shown in FIGS. 26B and 26C. In this way, the optical path control circuit can selectively connect the output side optical fiber 18 with one of the plurality of input side optical fibers 18', as shown in FIG. 26A. Light absorption agent may be filled in the cell 52 together with liquid 53, and the temperature of liquid 53 may be changed by making the light absorption body absorb light energy.

Figure 27:
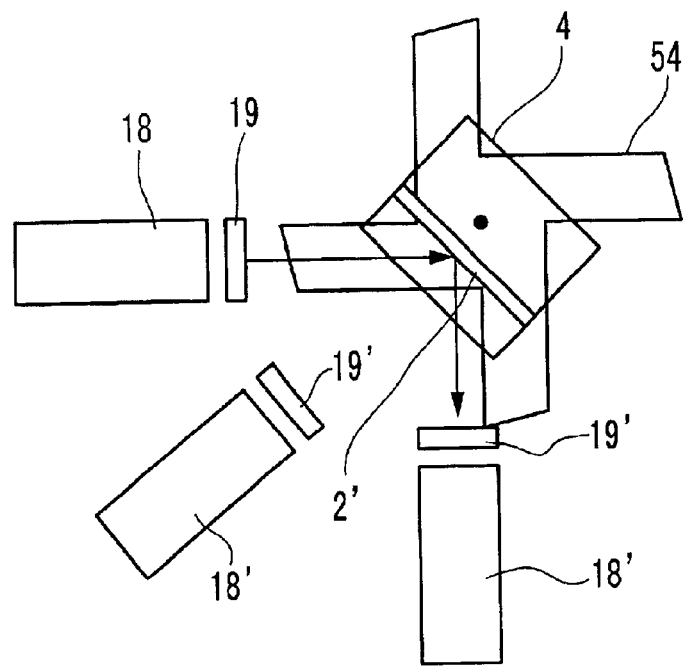
FIG. 27 is a plan view showing the optical path control apparatus according to an eleventh embodiment of the present invention.
Figure 28:
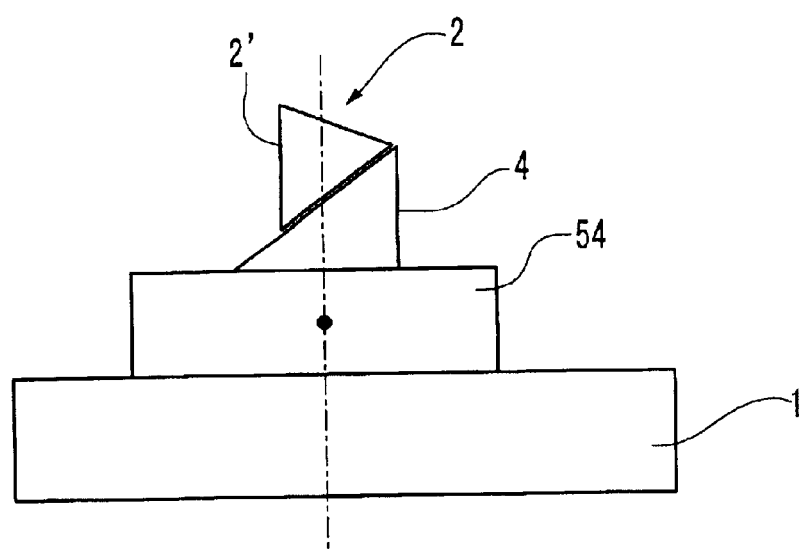
FIG. 28 is a cross sectional view showing the mirror section used in the optical path control apparatus according to the eleventh embodiment of the present invention.

FIGS. 27 and 28 show the optical path control apparatus according to the eleventh embodiment of the present invention. A micro light wheel 54 is provided on the substrate 1 to be rotatable. The micro light wheel 54 is a rotation symmetry but is not the mirror symmetrical. First and second lasers have light axes different from a rotation axis L of the micro light wheel 54. Laser beams are irradiated to the front and back directions of the micro light wheel 54, to form a light beam layer between the front surface and the back surface in the micro light wheel 54 so that the micro light wheel 54 is trapped in a floating state. By irradiating laser beams from one or more third lasers in the direction orthogonal to the wing portion of the micro light wheel 54, the micro light wheel 54 is kept rotatably in the floating state.

Figure 29:
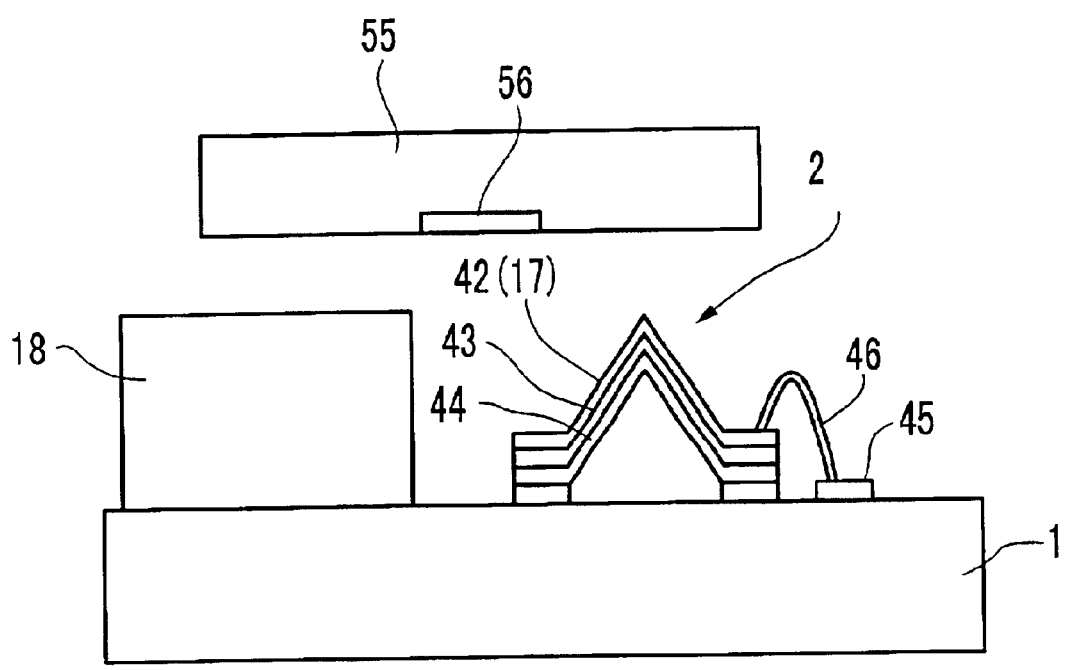
FIG. 29 is a cross sectional view showing the optical path control apparatus according to a twelfth embodiment of the present invention.

FIG. 29 shows the optical path control apparatus according to the twelfth embodiment of the present invention, especially, the application of the mirror section 2 shown in FIG. 19 and manufactured by the manufacturing method shown FIGS. 20A to 20D. Such the mirror section 2 is joined on the substrate 1. The mirror section 2 is composed of the mirror layer 42 as the above-mentioned surface layer, the piezoelectric film 43 as an intermediate layer, and an electrode layer 44 as the back layer. The light receiving section 55 is arranged in a position above the substrate 1. The light-receiving element 56 is arranged on the lower portion of the light receiving section 55.

Figure 30A:
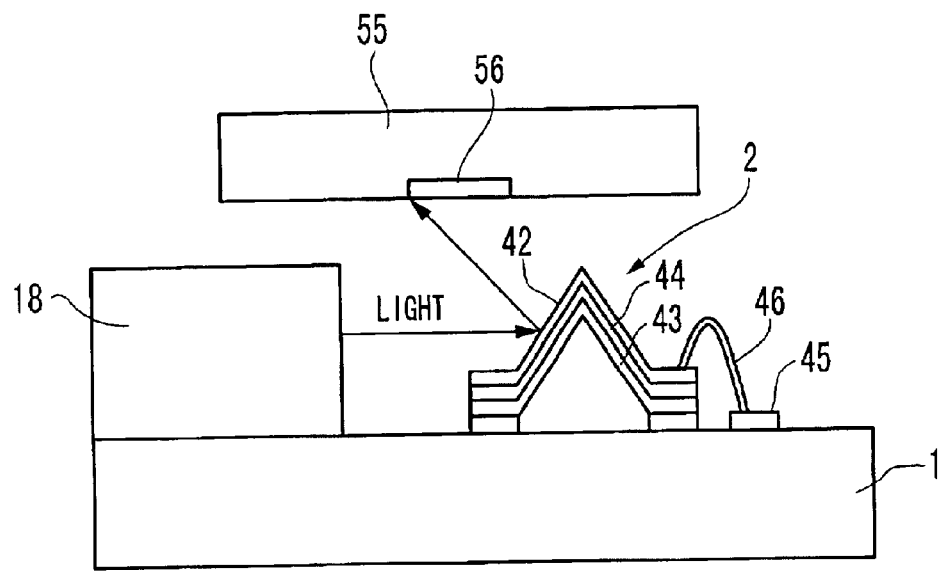
FIGS. 30A and 30B are cross sectional views showing the operating state of the optical path control apparatus in the twelfth embodiment.
Figure 30B:
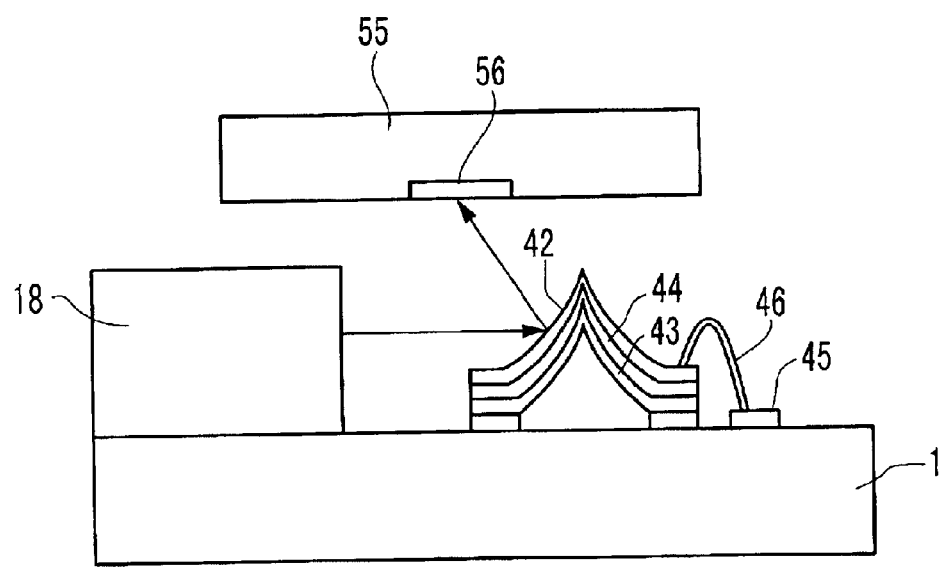

For the reason of thermal expansion, as shown in FIGS. 30A and 30B, if the mismatching in position between the light receiving element 56 and the mirror section 2, a voltage is applied between the electrode 45 and the electrode layer 44 so that the curvature of the mirror layer 42 is changed. Thus, it is possible to correctly control for the light outputted from the output side optical fiber 18 to be inputted to the light-receiving element 56 again. If the voltage value or current value of the light receiving element 56 changes, a feedback control circuit (not shown) detects the increase or decrease of the output value of the light receiving element 56 and controls such that the light receiving element 56 always correctly receives the light outputted from the output side optical fiber 18 by changing the application voltage to a positive or negative direction. Through such a control, the light coupling efficiency in the optical circuit can be most appropriately kept.

Figure 1:
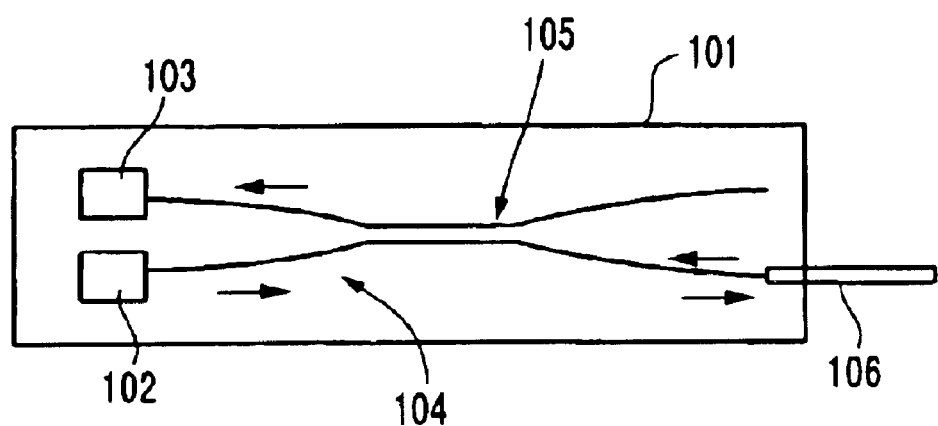
FIG. 1 is a plan view showing a first conventional example of an optical circuit.
Figure 2:
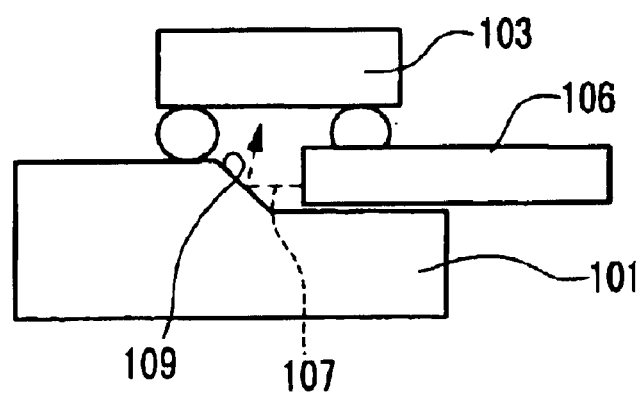
FIG. 2 is a cross sectional view showing a second conventional example of an optical circuit.
Figure 3:
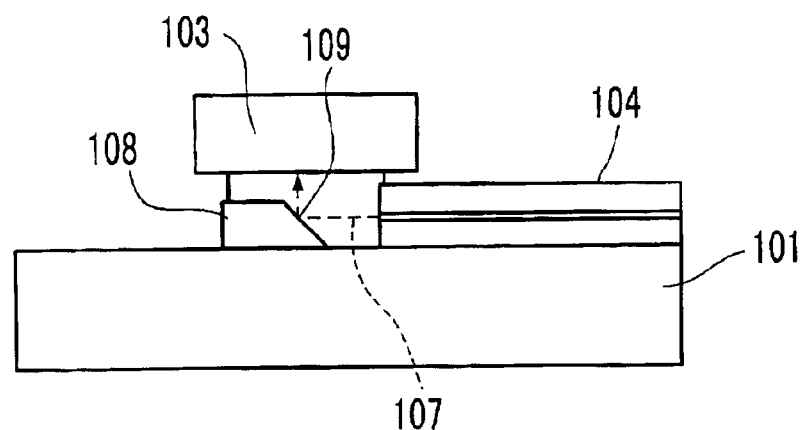
FIG. 3 is a cross sectional view showing a third conventional example of an optical circuit.
Figure 4:
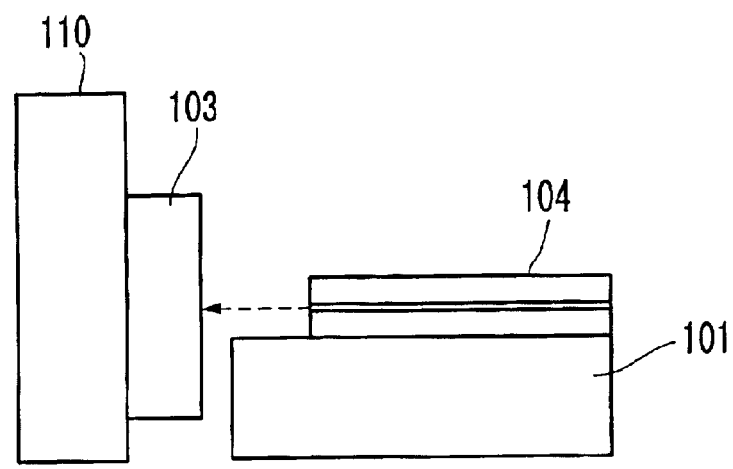
FIG. 4 is a cross sectional view showing a fourth conventional example of an optical circuit.
Figure 31A:
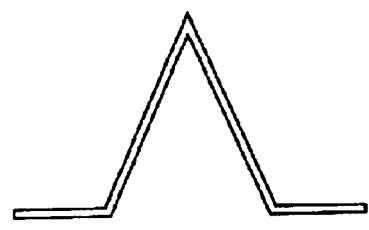
FIGS. 31A and 31B are cross sectional views showing the structures of a thin film mirror section and a lump shape mirror section.
Figure 31B:
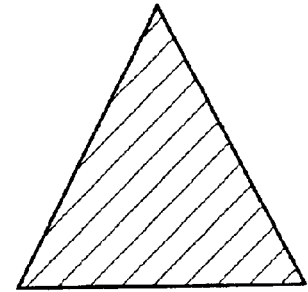
Figures 1, 32A:
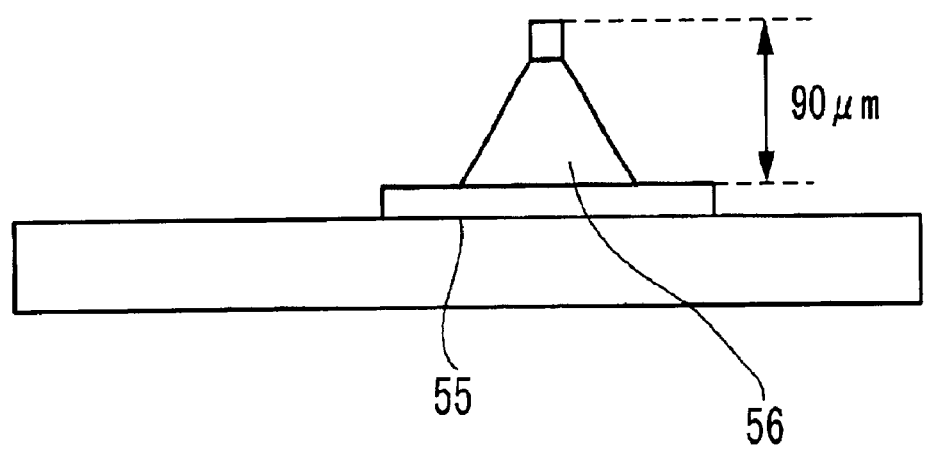
Figures 2, 32A:
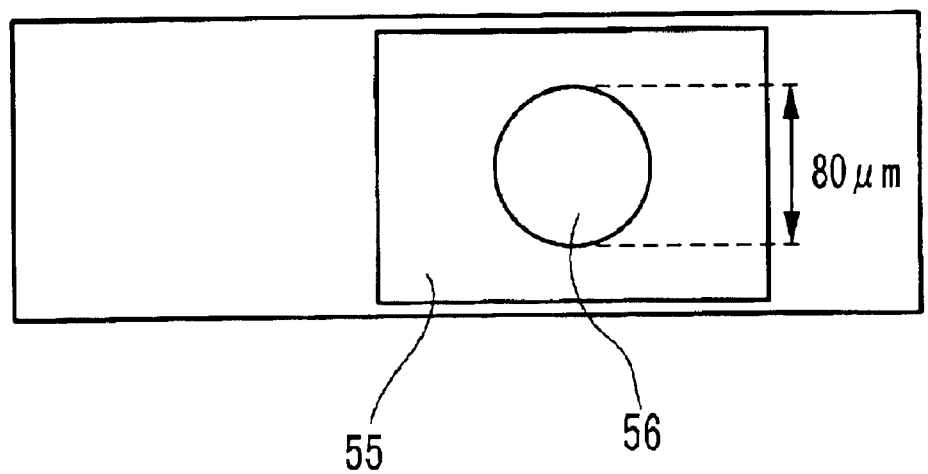

The mirror section 2 of a lump shape has the structure as shown in FIG. 31B. The mirror section which has the sectional structure of FIG. 31A is called a thin film mirror. The mirror section 2 of the lump shape is manufactured in the process shown in FIGS. 32A-1, 32A-2, 32B, 32C-1, and 32C-2. First, as shown in FIGS. 32A-1 and 32A-2, a gold bump 56 is formed on the substrate 1 using a wire bonder. A gold pad 55 is previously provided in a part of the substrate 1 where the gold bump should be formed. The gold bump has an approximately conical shape with the diameter of 80 μm in the bottom surface, and the height of 90 μm.

Figure 32B:
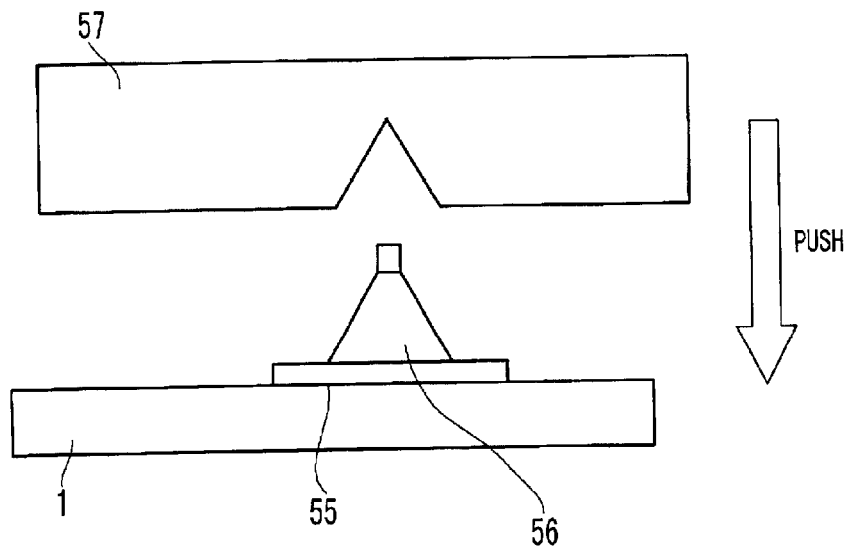
Figures 1, 32C:
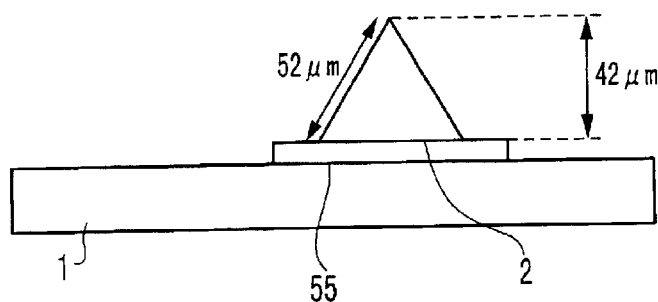
Figures 2, 32C:
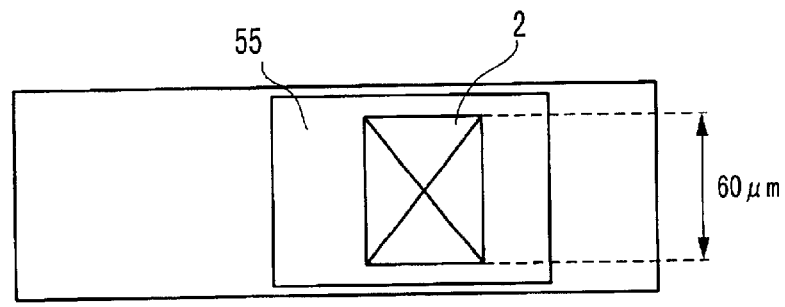

Next, a die 57 is pushed against the gold bump as shown FIG. 32B. Thus, the gold bump 56 is formed while applying at the temperature of 300° C. and the pressure of 50 g. As shown in FIGS. 32C-1 and 32C-2, the mirror section 2 can be obtained. The height of the mirror section 2 is 42 μm and the size of the reflection surface is 52 μm×60 μm. The die can be produced by etching a silicon substrate anisotropicaly or by processing metal such as stainless steel.

Figure 33:
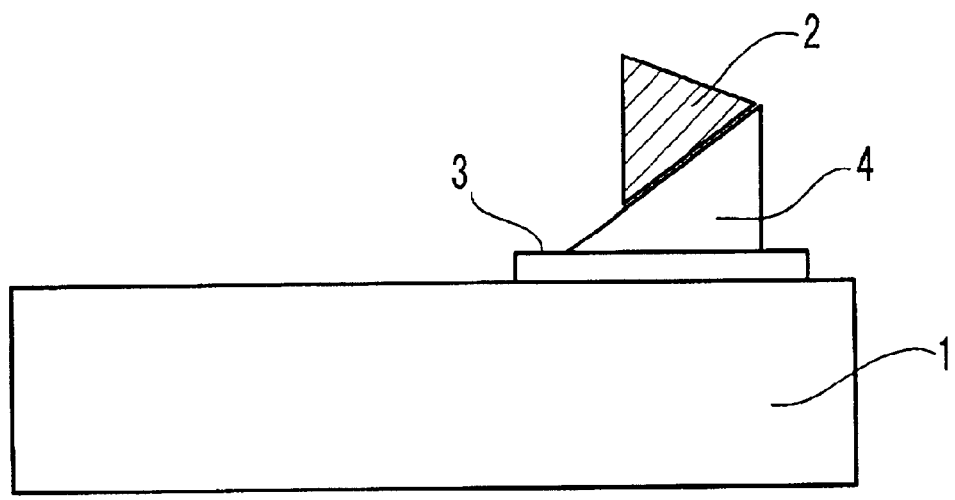
FIG. 33 is a cross sectional view showing the optical path control apparatus with the lump type of mirror section according to a thirteenth embodiment of the present invention.
Figure 35A:
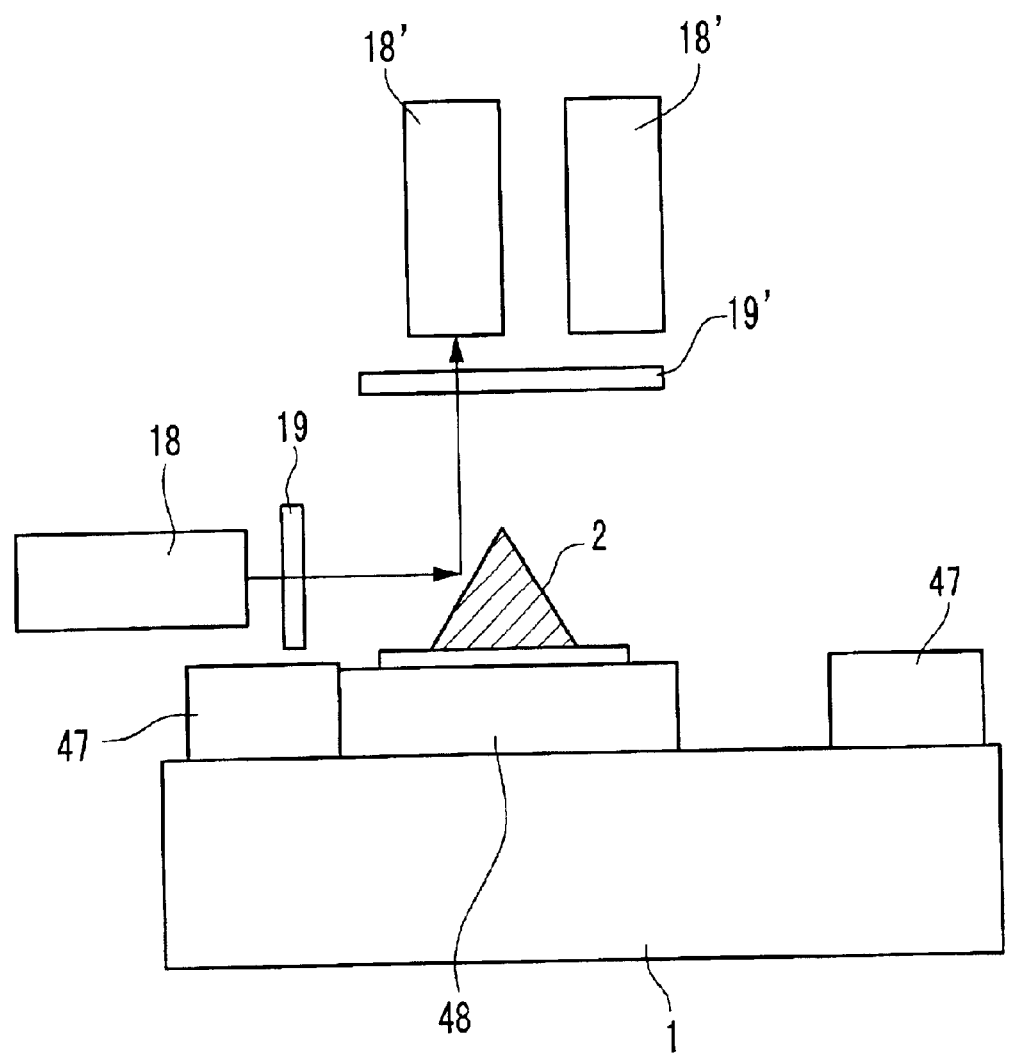
FIGS. 35A to 35C are cross sectional views of the optical path control apparatus according to a fifteenth embodiment of the present invention.
Figure 35B:
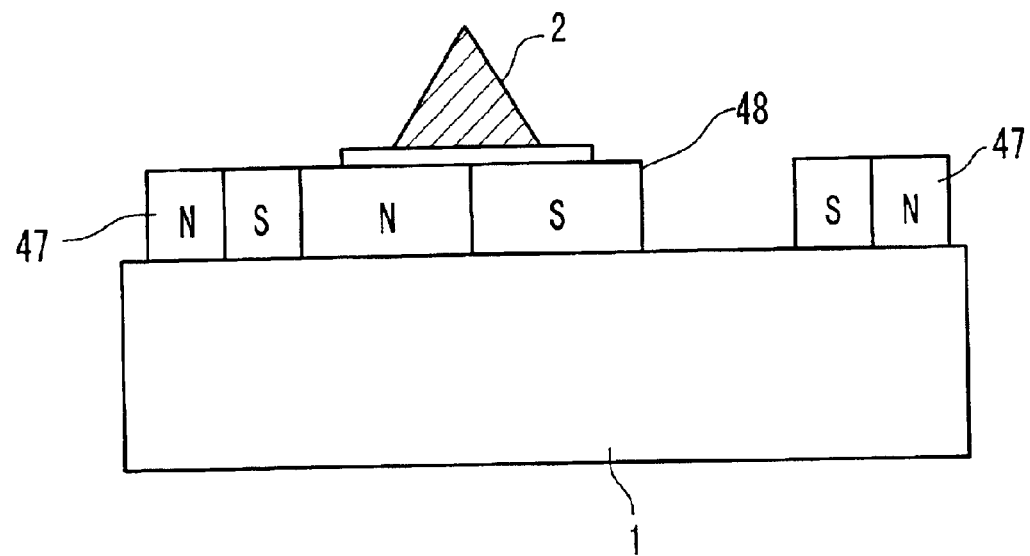
Figure 35C:
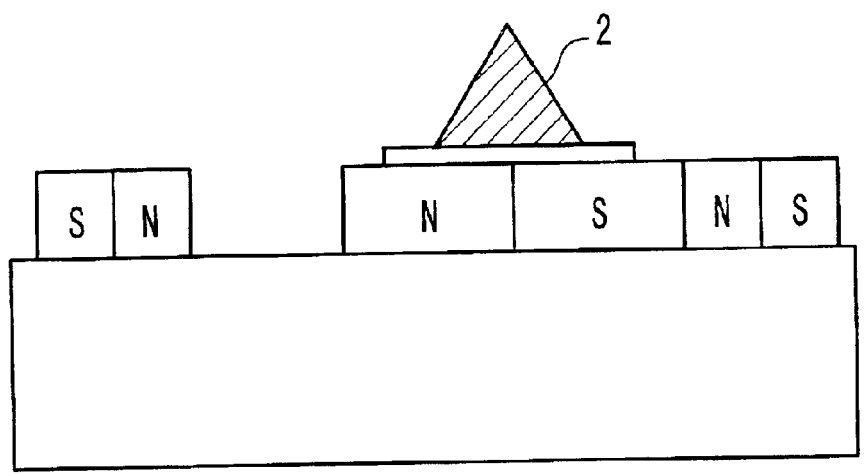
Figure 36A:
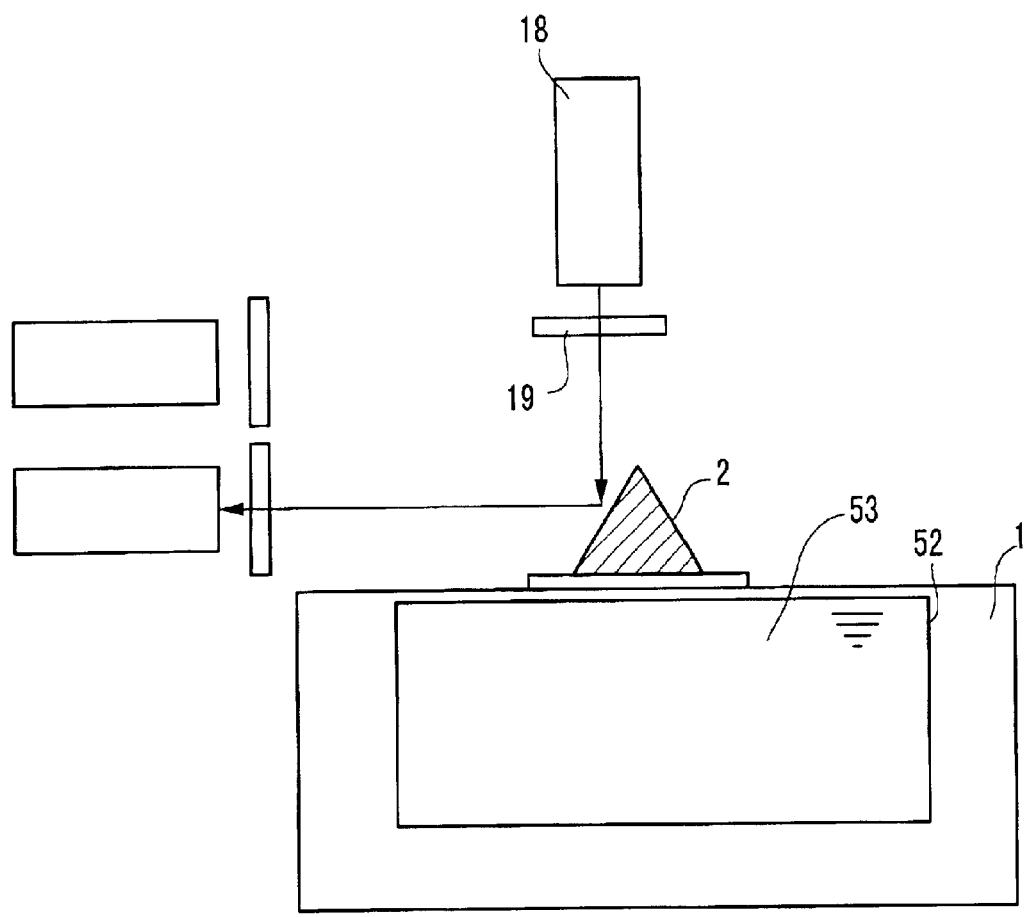
FIGS. 36A to 36C are cross sectional views showing the optical path control apparatus according to a sixteenth embodiment of the present invention.
Figure 36B:
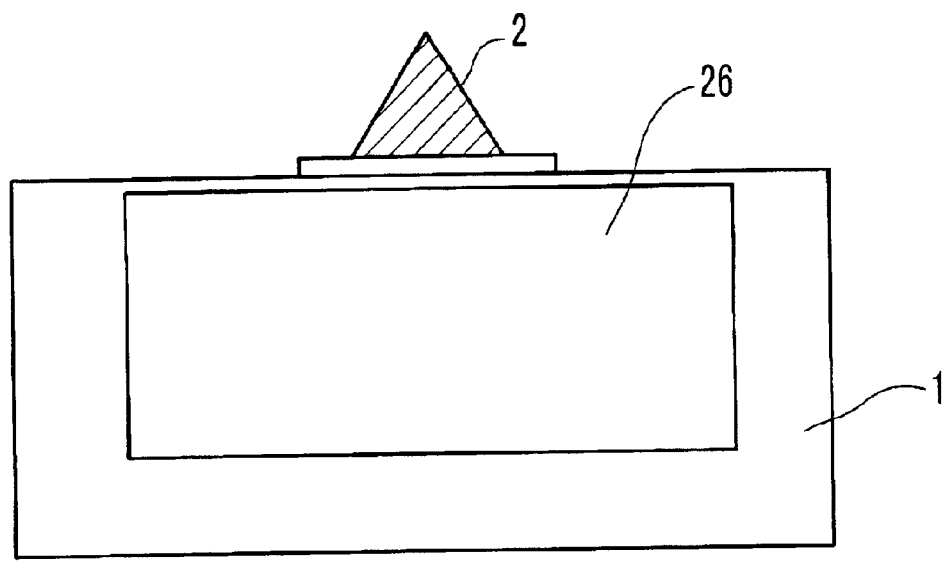
Figure 36C:
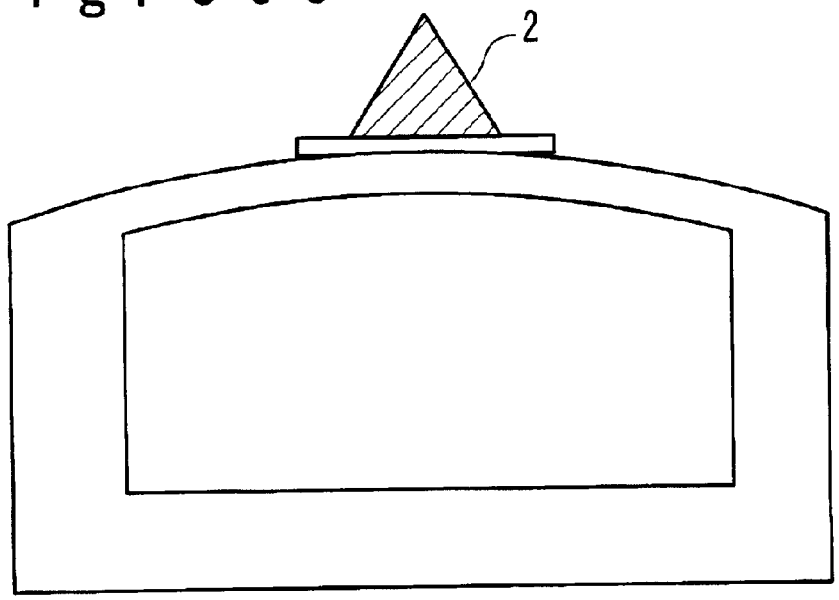
Figure 37A:
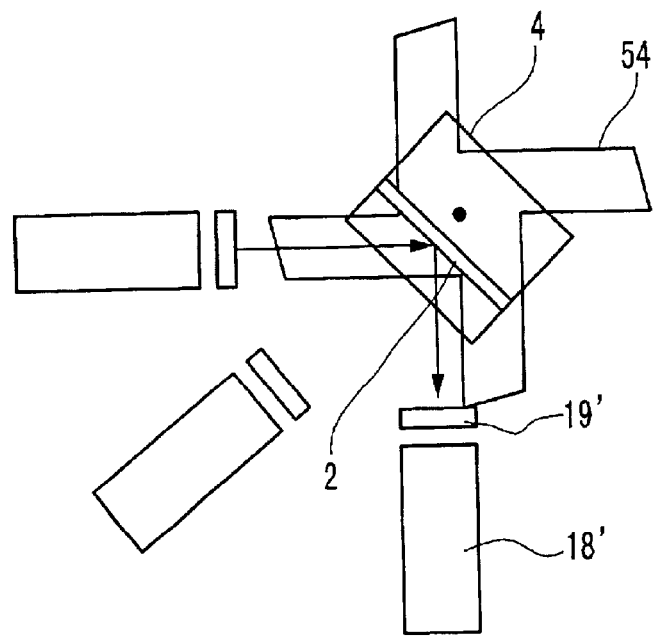
FIGS. 37A and 37B are a plan view and a cross sectional view showing the optical path control apparatus according to a seventeenth embodiment of the present invention.
Figure 37B:
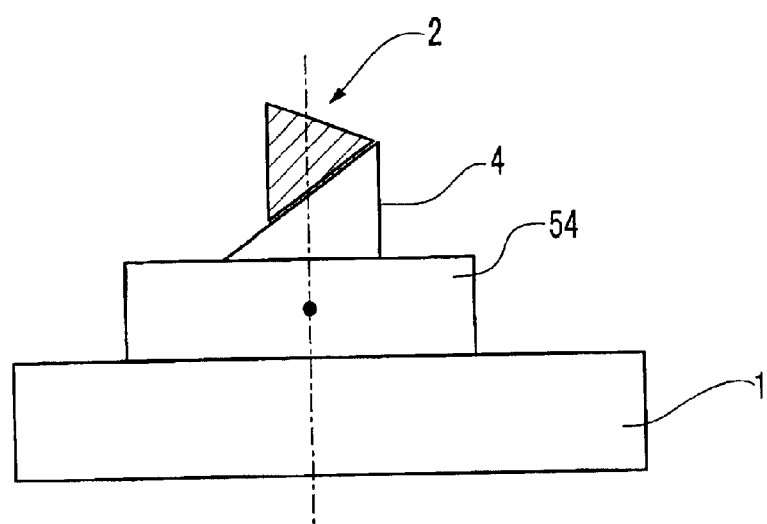

The mirror section 2 of this lump shape can be applied to the following light switches; the structure using the gear of FIG. 33 corresponding to FIG. 5, the structure in which a supersonic wave is generated by the piezo-electric device of FIGS. 34A and 34B corresponding to FIGS. 21A and 21B, the structure using a magnet and shown in FIGS. 35A to 35C corresponding to FIGS. 22A to 22C, the structure using liquid and shown in FIGS. 36A to 36C corresponding to FIGS. 26A to 26C, and the structure using the light pressure and shown in FIGS. 37A and 37B corresponding to FIGS. 27A and 27B.

The advantage using the mirror section of this lump shape is in that the strength of the mirror section increases and the change of the reflection surface shape with the temperature change becomes small, resulting in a stable reflection performance.

Figure 38A:
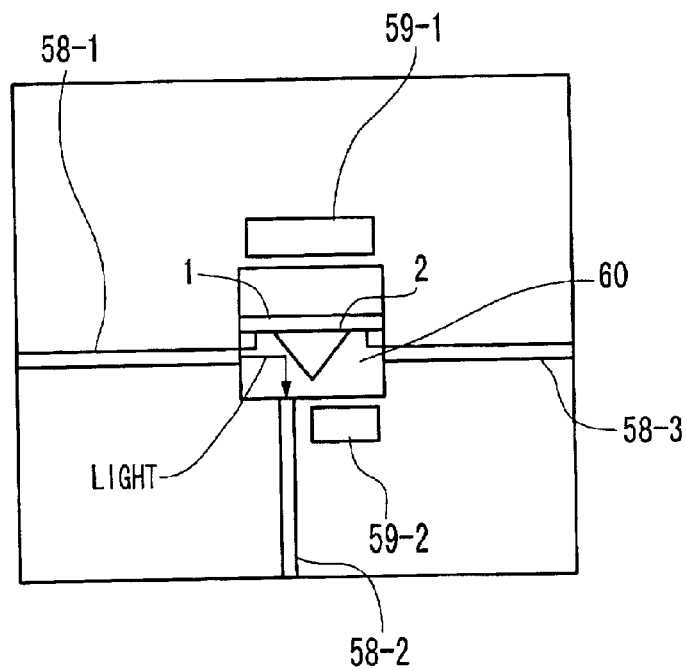
FIGS. 38A and 38B are diagrams showing the structure of the optical path control apparatus according to an eighteenth embodiment of the present invention.
Figure 38B:
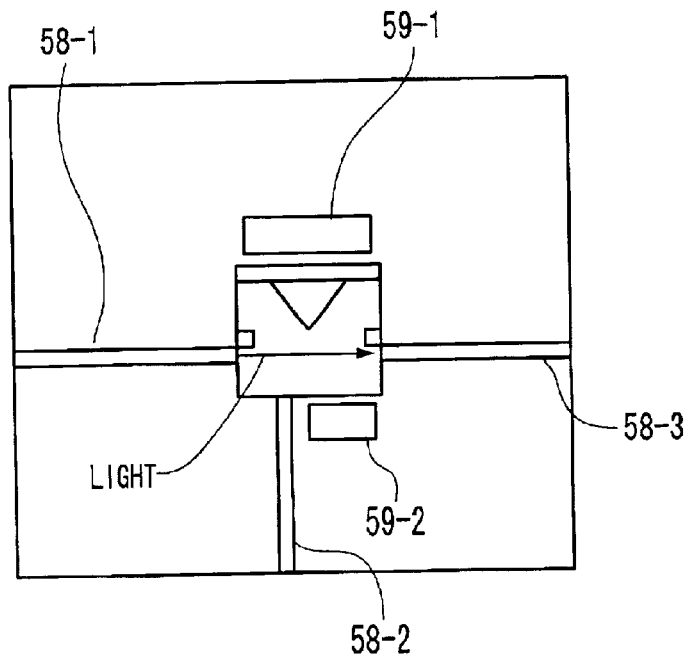

FIGS. 38A and 38B are diagrams showing the structure of the light switch as the optical path control apparatus according to eighteenth embodiment of the present invention. There are three optical waveguides 58 (58-1, 58-2, 58-3) and a hole is provided at an intersection section of the three optical waveguides 58. A gas 60 is filled in the hole and a substrate 1 with the micro mirror section 2 is provided in the hole. Moreover, heaters 59 (59-1 and 59-2) are provided for the positions shown in the figures.

Next, a method of driving the micro mirror section 2 will be described. In FIG. 38A, the gas is heated by the heater 59-1. Through this operation, the pressure in the upper section of the hole becomes higher than the pressure in the lower section of the hole, so that the micro mirror section 2 is fixed on the position shown in FIG. 38A. When the mirror section 2 is in this position, the light outputted from the left side optical waveguide 58-1 is reflected by the micro mirror section 2 and is led to the lower side optical waveguide 58-2. Oppositely, in FIG. 38B, the gas is heated by the heater 59-2. Through this operation, the pressure in the upper section of the hole becomes lower than the pressure in the lower section of the hole so that the mirror section 2 is moved and fixed on the position shown in FIG. 39B. When the mirror section 2 is in this position, the light from the left side optical waveguide 58-1 is not reflected by the micro mirror section 2 and enters the right side optical waveguide 58-3. Using these operations, the optical path can be changed. In other words, it is possible to use the optical path control apparatus as the light switch.

Figure 39A:
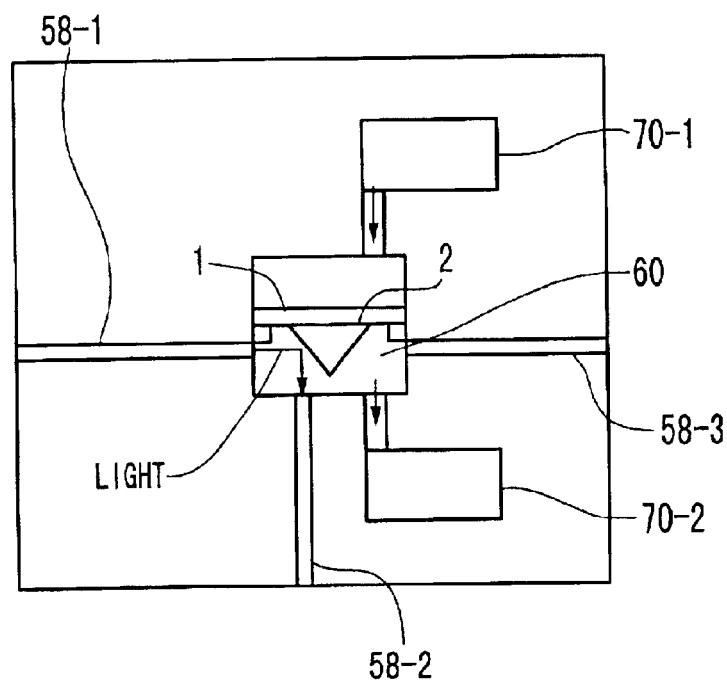
FIGS. 39A and 39B are diagrams showing the structure of the optical path control apparatus according to a nineteenth embodiment of the present invention.
Figure 39B:
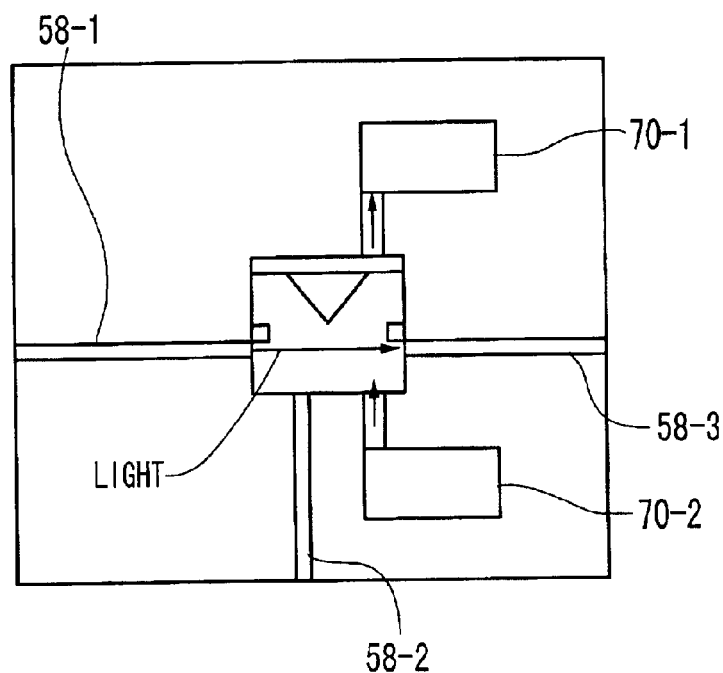

FIGS. 39A and 39B are diagrams showing the structure of the optical path control apparatus according to the nineteenth embodiment of the present invention. Pumps 70 (70-1 and 70-2) are used as shown in FIGS. 39A and 39B instead of the heaters 59. The mirror section 2 can be moved by absorbing and exhausting the gas using the pumps 70, to adjust the pressure of gas.

Liquid may be used instead of the gas. The hole at the intersection of the waveguides is previously filled with liquid. By discharging the liquid from the pump 70-1 and absorbing by the pump 70-2, the mirror section 2 is moved and then fixed on a position shown in FIG. 39A. When the upper and lower pumps 70 carry out the opposite operation, the mirror section 2 is moved and then fixed on a position shown in FIG. 39B. Even in the method using the liquid, the optical path can be switched like the case to use the gas.

Figures 1, 40A:
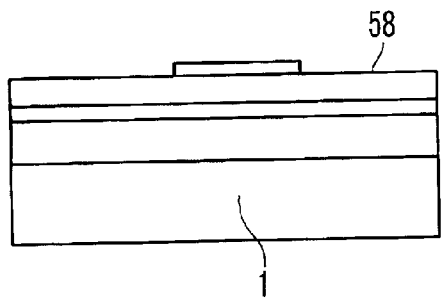
Figures 2, 40A:
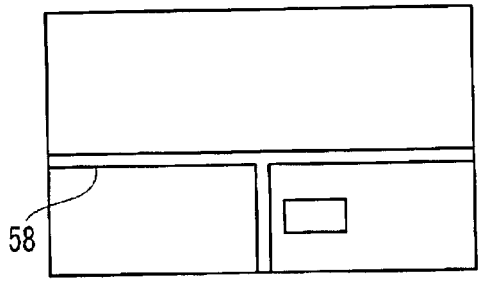
Figures 1, 40B:
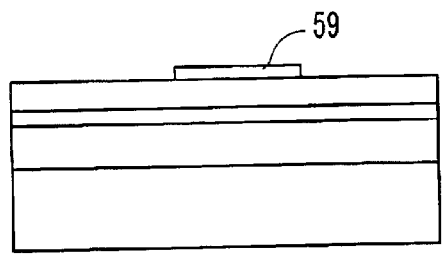
Figures 2, 40B:
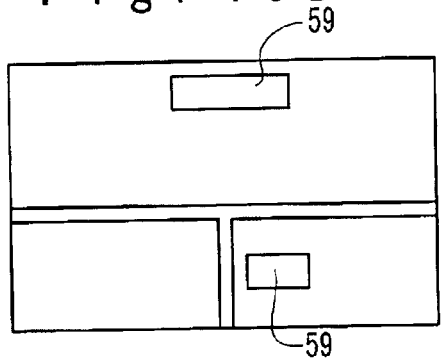
Figures 1, 40C:
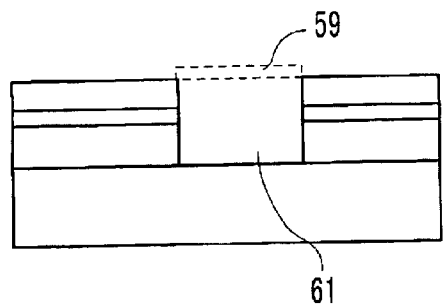
Figures 2, 40C:
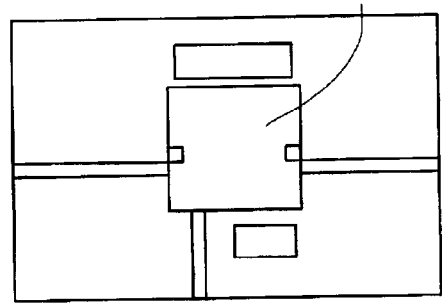
Figures 1, 40D:
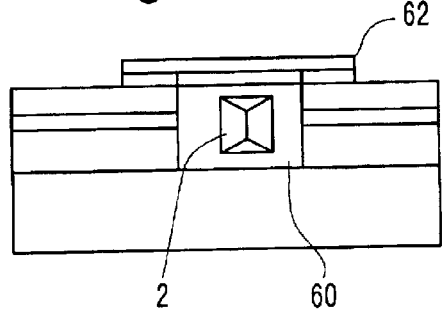
Figures 2, 40D:
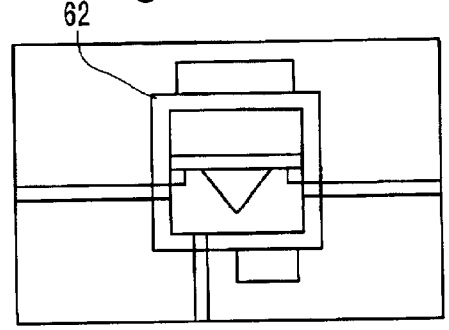

FIGS. 40A-1 to 40D-2 are diagrams showing the manufacturing method of the optical path control apparatus according to the eighteenth embodiment of the present invention. As shown in FIGS. 40A-1 and 40A-2, optical waveguides are formed by a chemical vapor deposition method and a reactive ion etching. In FIGS. 40B-1 and 40B-2, metal Ti: 100 angstrom and Au: 5000 angstroms are formed by the whole of substrate by a sputtering method to form the heaters 59. Next, a resist layer is coated to have the thickness of 1 μm and patterned in the shape of the heaters. After the metal is removed from an unnecessary portion by a dry etching method, and then the resist layer is removed. In FIGS. 40C-1 and 40C-2, a resist layer is coated and patterned and then the hole is formed at the intersection section of the optical waveguides using the dry etching method. In FIGS. 40D-1 and 40D-2, the mirror section 2 is inserted into the hole in the direction shown in the figures and the hole is covered by lids. In this example, air is used for the gas. Either of the mirror sections 2 of the lump shape and the thin film shape can be used. Thus, the light switch can be made in the above process.

As described above, according to the optical path control apparatus using the mirror section of the present invention, the mirror section can be installed on the substrate without processing the substrate. Therefore, the degrees of freedom when the mirror section is installed on the substrate is high. The mirror section is transferred onto the substrate and the transfer process is easy. For this reason, the mirror section is superior in mass productivity.

What is claimed is:

1. An optical path control apparatus comprising:

a first substrate, a second substrate which is movable relative to said first substrate;

a mirror section provided on said second substrate; and a driving section which moves said second substrate such that a first optical path of input light to said mirror section is optically connected to one of a plurality of second optical paths, wherein said driving section is an ultrasonic wave generating source, and said second substrate is moved by progressive waves generated by said ultrasonic wave generating source and is located on a position by standing waves, and said first optical path is optically connected to said second optical path associated with said position.

2. An optical path control apparatus comprising:

a first substrate;

a second substrate which is movable to relative to said first substrate, said second substrate being in contact with said first substrate, while said second substrate is moving relative to said first substrate;

a mirror section provided on said second substrate to have a relative surface with a fixedly predetermined angle with respect to a surface of said second substrate; and a driving section which moves said second substrate such that a first optical path of input light to said mirror section is optically connected to one of a plurality of second optical paths, wherein said second substrate has a gear shape, and said mirror section is provided on said second substrate via a base section, said driving section has an electrostatic actuator, and rotates said second substrate based on force generated by said electrostatic actuator such that said mirror section is rotated, and said first optical path is optically connected to said second optical path associated with a rotation angle of said mirror section.

3. An optical path control apparatus comprising:

a first substrate;

a second substrate which is movable relative to said first substrate;

a mirror section provided on said second substrate; and a driving section which moves said second substrate such that a first optical path of input light to said mirror section is optically connected to one of a plurality of second optical paths, wherein said second substrate has a micro light wheel, said driving section has lasers, and rotates said second substrate based on laser beams emitted by said lasers, and said first optical path is optically connected to said second optical path associated with a rotation angle of said mirror section.

4. An optical path control apparatus comprising:

a first substrate;

a second substrate which is movable relative to said first substrate;

a mirror section provided on said second substrate; and a driving section which moves said second substrate such that a first optical path of input light to said mirror section is optically connected to one of a plurality of second optical paths, wherein said second substrate is provided in a concave section of said first substrate, said concave section being filled with fluid;

said driving section moves said second substrate by supplying said fluid from one end of said concave section and absorbing said fluid from another end of said concave section, said mirror section reflects said input light based on the movement of said second substrate such that said first optical path is optically connected to said second optical path.

5. An optical path control apparatus comprising:

a substrate; and a mirror section which has a reflective surface with a fixedly predetermined angle with respect to a surface of said substrate and is provided on said substrate and changes an optical path of reflection light to input light by said mirror section in response to an input signal, wherein said mirror section comprises:

a mirror layer provided as a surface layer;

a layer changing its shape in response to said input signal provided under said mirror layer; and an electrode layer provided under said layer changing its shape, wherein said mirror layer of said mirror section is transformed through transformation of said layer changing its shape in response to supply of said input signal such that a reflection angle of said mirror section is changed.

6. An optical path control apparatus comprising:

a substrate; and a mirror section which is provided on said substrate and changes an optical path of reflection light to input light by said mirror section in response to an input signal, wherein said mirror section comprises:
- a mirror layer provided as a surface layer;
- a shape memory layer provided under said mirror layer; and
- a heating layer provided under said shape memory layer, wherein said mirror layer of said mirror section is transformed due to transformation of said shape memory layer through heating by said heating layer in response to said input signal such that a reflection angle of said mirror section is changed.

7. An optical path control apparatus comprising:

a first substrate;

a second substrate which is movable relative to said first substrate;

a mirror section provided over said first and second substrate, and having a reflective surface with an angle larger than zero with respect to a surface of said first substrate, and said reflective surface being on a side of said first substrate; and a driving section which moves said second substrate such that a first optical path of input light to said mirror section is optically connected to one of a plurality of second optical paths.

* * * * *